US012690039B2

(12) United States Patent
Yin et al.

(10) Patent No.: US 12,690,039 B2
(45) Date of Patent: Jul. 21, 2026

(54) USER EQUIPMENT, BASE STATION, AND METHOD

(71) Applicant: SHARP KABUSHIKI KAISHA, Sakai City (JP)

(72) Inventors: Zhanping Yin, Vancouver, WA (US); Kazunari Yokomakura, Sakai City (JP); Kai Ying, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 487 days.

(21) Appl. No.: 18/031,121

(22) PCT Filed: Oct. 14, 2021

(86) PCT No.: PCT/JP2021/037990
§ 371 (c)(1),
(2) Date: Apr. 10, 2023

(87) PCT Pub. No.: WO2022/080439
PCT Pub. Date: Apr. 21, 2022

(65) Prior Publication Data
US 2023/0379917 A1 Nov. 23, 2023

Related U.S. Application Data

(60) Provisional application No. 63/092,398, filed on Oct. 15, 2020.

(51) Int. Cl.
*H04W 72/21* (2023.01)

(52) U.S. Cl.
CPC .................................. *H04W 72/21* (2023.01)

(58) Field of Classification Search
CPC .... H04W 72/21; H04W 72/569; H04L 1/1671
See application file for complete search history.

(56) References Cited

U.S. PATENT DOCUMENTS

| | | | |
|---|---|---|---|
| 2021/0250134 A1* | 8/2021 | Islam | H04B 7/0626 |
| 2021/0345370 A1* | 11/2021 | Lee | H04L 1/1671 |
| 2022/0116960 A1* | 4/2022 | Yang | H04L 1/1854 |
| 2023/0180245 A1* | 6/2023 | Bae | H04W 72/1268 |
| 2023/0354313 A1* | 11/2023 | Yin | H04L 1/1854 |

* cited by examiner

*Primary Examiner* — Jae Y Lee
*Assistant Examiner* — Nick Anon Sundara
(74) *Attorney, Agent, or Firm* — ScienBiziP, P.C.

(57) ABSTRACT

A user equipment (UE) is described. The UE includes a processor configured to determine that joint reporting of uplink control information (UCI) with different priorities is configured and a multiplexing timeline is satisfied. The processor is also configured to multiplex more than two bits of a hybrid automatic repeat request-acknowledgement (HARQ-ACK) and a scheduling request (SR) using a physical uplink control channel (PUCCH) format 2, PUCCH format 3 or PUCCH format 4. The HARQ-ACK and the SR have different priorities. The UE also includes transmitting circuitry configured to transmit the multiplexed HARQ-ACK and SR on a PUCCH.

15 Claims, 17 Drawing Sheets

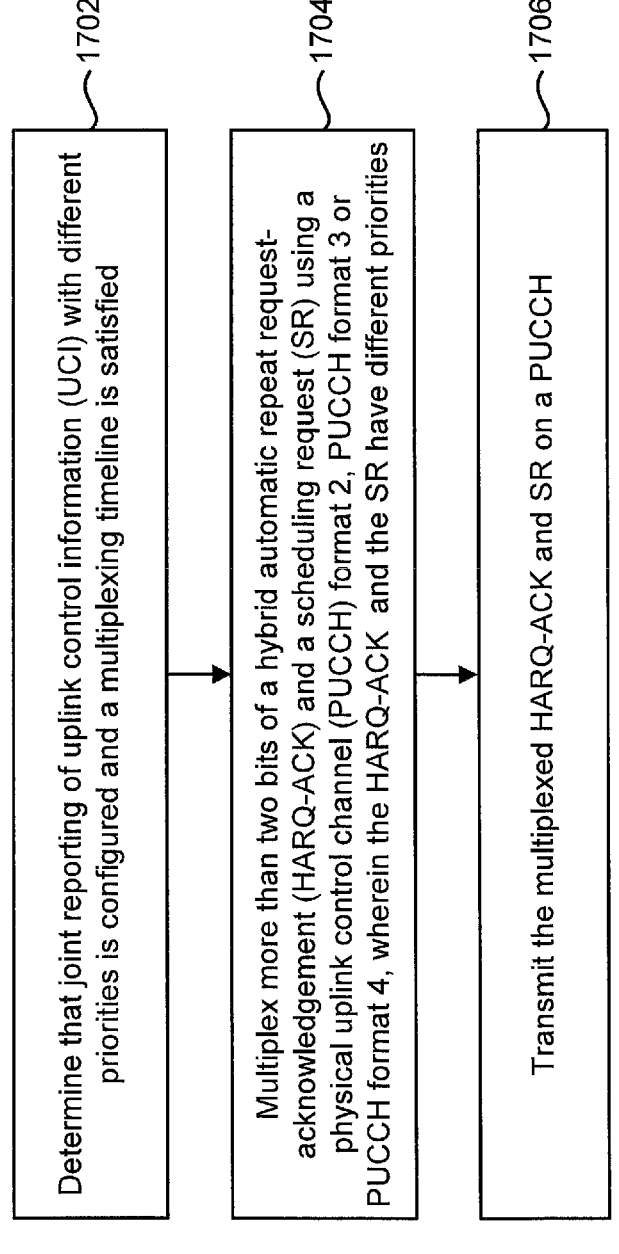

Determine that joint reporting of uplink control information (UCI) with different priorities is configured and a multiplexing timeline is satisfied ⌐1702

Multiplex more than two bits of a hybrid automatic repeat request-acknowledgement (HARQ-ACK) and a scheduling request (SR) using a physical uplink control channel (PUCCH) format 2, PUCCH format 3 or PUCCH format 4, wherein the HARQ-ACK and the SR have different priorities ⌐1704

Transmit the multiplexed HARQ-ACK and SR on a PUCCH ⌐1706

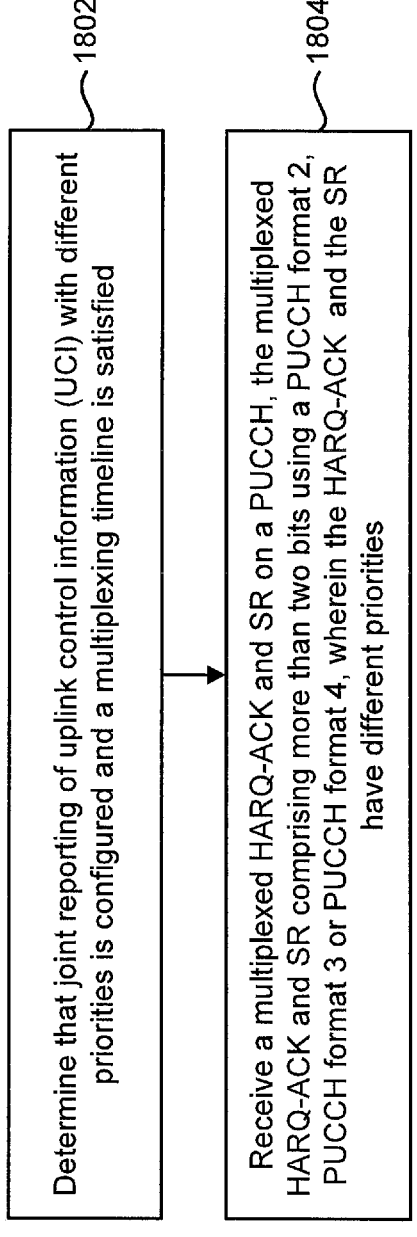

Determine that joint reporting of uplink control information (UCI) with different priorities is configured and a multiplexing timeline is satisfied ⟍1802

Receive a multiplexed HARQ-ACK and SR on a PUCCH, the multiplexed HARQ-ACK and SR comprising more than two bits using a PUCCH format 2, PUCCH format 3 or PUCCH format 4, wherein the HARQ-ACK and the SR have different priorities ⟍1804

USER EQUIPMENT, BASE STATION, AND METHOD

TECHNICAL FIELD

The present disclosure relates generally to communication systems. More specifically, the present disclosure relates to joint reporting of HARQ-ACK and SR with different priorities for more than 2 bits of HARQ-ACK with PUCCH format 2/3/4.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: a processor configured to: determine that joint reporting of uplink control information (UCI) with different priorities is configured and a multiplexing timeline is satisfied; and multiplex more than two bits of a hybrid automatic repeat request-acknowledgement (HARQ-ACK) and a scheduling request (SR) using a physical uplink control channel (PUCCH) format 2, PUCCH format 3 or PUCCH format 4, wherein the HARQ-ACK and the SR have different priorities; and transmitting circuitry configured to transmit the multiplexed HARQ-ACK and SR on a PUCCH.

In one example, a base station (gNB), comprising: a processor configured to determine that joint reporting of uplink control information (UCI) with different priorities is configured and a multiplexing timeline is satisfied; and receiving circuitry configured to receive a multiplexed hybrid automatic repeat request-acknowledgement (HARQ-ACK) and scheduling request (SR) on a physical uplink control channel (PUCCH), the multiplexed HARQ-ACK and SR comprising more than two bits using a PUCCH format 2, PUCCH format 3 or PUCCH format 4, wherein the HARQ-ACK and the SR have different priorities.

In one example, a method by a user equipment (UE), comprising: determining that joint reporting of uplink control information (UCI) with different priorities is configured and a multiplexing timeline is satisfied; multiplexing more than two bits of a hybrid automatic repeat request-acknowledgement (HARQ-ACK) and a scheduling request (SR) using a physical uplink control channel (PUCCH) format 2, PUCCH format 3 or PUCCH format 4, wherein the HARQ- ACK and the SR have different priorities; and transmitting the multiplexed HARQ-ACK and SR on a PUCCH.

BRIEF DESCRIPTION OF DRAWINGS

FIG. 17 is a flow diagram illustrating a method by a UE.

FIG. 18 is a flow diagram illustrating a method by a gNB.

DESCRIPTION OF EMBODIMENTS

Figure 1:
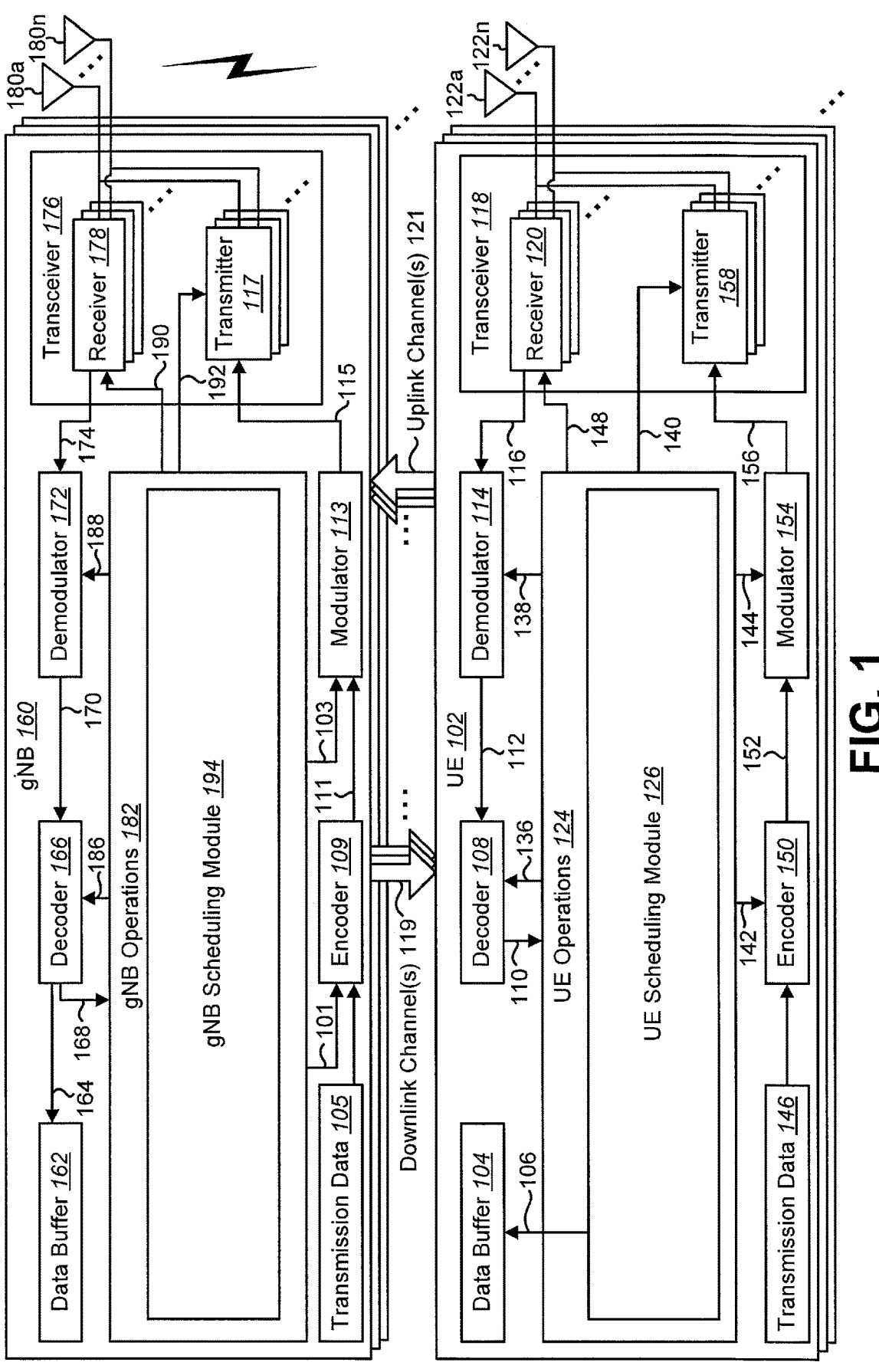
FIG. 1 is a block diagram illustrating one implementation of one or more gNBs and one or more UEs in which systems and methods for joint reporting of HARQ-ACK and SR with different priorities may be implemented.

A user equipment (UE) is described. The UE includes a processor configured to determine that joint reporting of uplink control information (UCI) with different priorities is configured and a multiplexing timeline is satisfied. The processor is also configured to multiplex more than two bits of a hybrid automatic repeat request-acknowledgement (HARQ-ACK) and a scheduling request (SR) using a physical uplink control channel (PUCCH) format 2, PUCCH format 3 or PUCCH format 4. The HARQ-ACK and the SR have different priorities. The UE also includes transmitting circuitry configured to transmit the multiplexed HARQ-ACK and SR on a PUCCH.

In some examples, bits may be appended to the HARQ-ACK by counting scheduling requests (SRs) with all priorities together based on SR indexes. In some examples, bits may be appended to the HARQ-ACK by counting SRs separately based on SR indexes within each priority. In some examples, bits may be prepended to the HARQ-ACK for SRs with high priority and bits are appended to the low priority HARQ-ACK for SRs with low priority. In some examples, bits may be appended or prepended to the HARQ-ACK by counting SRs with high priorities only.

In some examples, power boosting may be used on the PUCCH transmission if a positive SR with priority index 1 is reported with a HARQ-ACK with priority index 0. In some examples, a low priority HARQ-ACK and low priority SRs may be joint reported if no positive high priority SR is reported. In some examples, a high priority PUCCH resource may be selected to report a low priority HARQ-ACK and a positive high priority SR.

A base station (gNB) is also described. The gNB includes a processor configured to determine that joint reporting of UCI with different priorities is configured and a multiplexing timeline is satisfied. The gNB also includes receiving circuitry configured to receive a multiplexed HARQ-ACK and SR on a PUCCH. The multiplexed HARQ-ACK and SR include more than two bits using a PUCCH format 2, PUCCH format 3 or PUCCH format 4. The HARQ-ACK and the SR have different priorities.

A method by a UE is also described. The method includes determining that joint reporting of UCI with different priorities is configured and a multiplexing timeline is satisfied. The method also includes multiplexing more than two bits of a HARQ-ACK and a SR using a PUCCH format 2, PUCCH format 3 or PUCCH format 4. The HARQ-ACK and the SR have different priorities. The method further includes transmitting the multiplexed HARQ-ACK and SR on a PUCCH.

A method by a base station (gNB) is also described. The method includes determining that joint reporting of UCI with different priorities is configured and a multiplexing timeline is satisfied. The method also includes receiving a multiplexed HARQ-ACK and SR on a PUCCH. The multiplexed HARQ-ACK and SR includes more than two bits using a PUCCH format 2, PUCCH format 3 or PUCCH format 4. The HARQ-ACK and the SR have different priorities.

The 3rd Generation Partnership Project, also referred to as "3GPP," is a collaboration agreement that aims to define globally applicable technical specifications and technical reports for third, fourth, and fifth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14, 15, 16, 17, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station or base station device.

In NR Rel-16, UCI multiplexing is supported only within the same priority. For intra-UE collision between uplink channels with different priorities, the uplink channel with high priority is transmitted, and the low priority channel is dropped. In NR Rel-17, UCI multiplexing between different priorities will be supported. For UCI multiplexing on PUCCH, at least the following scenarios will be supported: multiplexing a high-priority HARQ-ACK and a low-priority HARQ-ACK into a PUCCH; multiplexing a low-priority HARQ-ACK and a high-priority SR into a PUCCH for some HARQ-ACK/SR PF combinations; multiplexing a low-priority HARQ-ACK, a high-priority HARQ-ACK and a high-priority SR into a PUCCH.

Examples for multiplexing a low-priority HARQ-ACK and a high-priority SR into a PUCCH for some HARQ-ACK/SR PUCCH format combinations are described herein. Configuration and conditions for UCI multiplexing with different priorities are described. For example, new RRC configurations can be specified to allow multiplexing of UCI with different priorities on PUCCH or PUSCH. Separate RRC parameters can be configured for multiplexing of UCI with different priorities on PUCCH and PUSCH respectively. The channel dropping timeline and UCI multiplexing timeline can be satisfied.

If joint reporting of UCI with different priorities is configured and the multiplexing timeline is satisfied, the examples described herein provide detailed methods for reporting high priority SR with low priority HARQ-ACK. These examples focus on joint reporting of HARQ-ACK and SR with different priorities for more than 2 bits of HARQ-ACK using PUCCH format 2, PUCCH format 3 or PUCCH format 4 (referred to herein as PUCCH format 2/3/4).

For more than 2 bits of HARQ-ACK, a PUCCH format 2 or PUCCH format 3 or PUCCH format 4 may be used. The SR status and the positive SR index may be jointly reported with HARQ-ACK.

In a first method (Method 1), bits may be appended to HARQ-ACK by counting SR with all priorities together based on SR indexes.

In a second method (Method 2), bits may be appended to HARQ-ACK by counting SRs separately based on SR indexes within each priority. In a first approach, the bits representing low priority SRs may be appended to the HARQ-ACK with priority index 0 first, followed by the bits representing high priority SRs. In a second approach, the bits representing high priority SRs are appended to the HARQ-ACK with priority index 0 first, followed by the bits representing low priority SRs.

In a third method (Method 3), bits may be prepended to HARQ-ACK for SRs with high priority and append bit to HARQ-ACK for SRs with low priority.

In a fourth method (Method 4), bits may be appended or prepended to HARQ-ACK by counting SRs with high priorities only. In a first approach, a number of bits representing a negative or positive SR with priority index 1 is appended to the HARQ-ACK information. In a second approach, a number of bits representing a negative or positive SR with priority index 1 is prepended to the HARQ-ACK information.

In a fifth method, (Method 5), power boosting may be applied for positive high priority SR. For all methods 1-4 above, additionally, if a positive SR with priority index 1 is reported with HARQ-ACK with priority index 0, power boosting on the PUCCH transmission may be used to enhance the indication of a positive high priority SR.

In a sixth method (Method 6), a PUCCH resource may be selected for high priority HARQ-ACK to jointly report low priority HARQ-ACK and positive high priority SR. If no positive high priority SR, low priority HARQ-ACK and low priority SR may be joint reported with existing methods (e.g., only low priority SR is counted and reported). With positive high priority SR, a high priority PUCCH resource may be selected to report the low priority HARQ-ACK and high priority SRs only. Low priority SRs are not counted, and not reported. In a first approach, a number of bits representing a positive SR with priority index 1 is appended to the low priority HARQ-ACK information. In a second approach, a number of bits representing a positive SR with priority index 1 is prepended to the low priority HARQ-ACK information.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for joint reporting of HARQ-ACK and SR with different priorities may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

In some examples, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR) signals. The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. For example, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104, and a UE operations module 124. For example, one or more reception and/or transmission paths may be implemented in the UE 102. For convenience, only a single transceiver 118, decoder 108, demodulator 114, encoder 150, and modulator 154 are illustrated in the UE 102, though multiple parallel elements (e.g., transceivers 118, decoders 108, demodulators 114, encoders 150, and modulators 154) may be implemented.

The transceiver 118 may include one or more receivers 120 and one or more transmitters 158. The one or more receivers 120 may receive signals from the gNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126. In some examples, the UE scheduling module 126 may be utilized to perform joint reporting of HARQ-ACK and SR with different priorities as described herein.

A high priority UCI may be a high priority HARQ-ACK or a high priority SR. A high priority HARQ-ACK corresponds to a high priority PDSCH transmission. The priority of a scheduled PDSCH transmission may be determined by the priority indication in the scheduling DCI. The priority of a SPS PDSCH transmission may be configured by higher layer signaling. A high priority PUCCH resource may be used to report high priority HARQ-ACK with or without SR. A high priority PDSCH, HARQ-ACK or PUCCH resource may be configured to support URLLC services. The high priority may be configured with a priority index 1.

A low priority UCI may be a low priority HARQ-ACK or a low priority SR, or a CSI report, etc. A low priority HARQ-ACK may correspond to a low priority PDSCH transmission. The priority of a scheduled PDSCH transmission may be determined by the priority indication in the scheduling DCI. The priority of a SPS PDSCH transmission may be configured by higher layer signaling. A low priority PUCCH resource may be used to report low priority UCI. A low priority PDSCH, HARQ-ACK or PUCCH resource may be configured to support eMBB services. The low priority may be configured with a priority index 0.

For HARQ-ACK priorities, if a UE is provided with pdsch-HARQ-ACK-Codebook-List, the UE can be indicated by pdsch-HARQ-ACK-Codebook-List to generate one or two HARQ-ACK codebooks. If the UE is indicated to generate two HARQ-ACK codebooks, then a first HARQ-ACK codebook is associated with a PUCCH of priority index 0 and a second HARQ-ACK codebook is associated with a PUCCH of priority index 1.

For SR priorities, a UE can be configured by SchedulingRequestResourceConfig a set of configurations for SR in a PUCCH transmission using either PUCCH format 0 or PUCCH format 1. A UE can be configured by schedulingRequestTDForBFR a configuration for LRR in a PUCCH transmission using either PUCCH format 0 or PUCCH format 1. The UE can be configured, by schedulingRequest-Priority in SchedulingRequestResourceConfig, a priority index 0 or a priority index 1 for the SR.

A PUSCH or a PUCCH, including repetitions if any, can be of priority index 0 or of priority index 1. If a priority index is not provided for a PUSCH or a PUCCH, the priority index is 0. If in an active DL BWP a UE monitors PDCCH either for detection of DCI format 0_1 and DCI format 1_1 or for detection of DCI format 0_2 and DCI format 12, a priority index can be provided by a priority indicator field. If a UE indicates a capability to monitor, in an active DL BWP, PDCCH for detection of DCI format 0_1 and DCI format 1_1 and for detection of DCI format 0_2 and DCI format 1_2, a DCI format 0_1 or a DCI format 0_2 can schedule a PUSCH transmission of any priority and a DCI format 1_1 or a DCI format 1_2 can schedule a PDSCH reception and trigger a PUCCH transmission with corresponding HARQ-ACK information of any priority. If, after resolving overlapping for PUCCH and/or PUSCH transmissions of a same priority index, a UE determines to transmit a first PUCCH of larger priority index, a PUSCH or a second PUCCH of smaller priority index, and a transmission of the first PUCCH would overlap in time with a transmission of the PUSCH or the second PUCCH, the UE does not transmit the PUSCH or the second PUCCH. If, after resolving overlapping for PUCCH and/or PUSCH transmissions of a same priority index, a UE determines to transmit a PUSCH of larger priority index, a PUCCH of smaller priority index, and a transmission of the PUSCH would overlap in time with a transmission of the PUCCH, the UE does not transmit the PUCCH. If, after resolving overlapping for PUCCH and/or PUSCH transmissions of a same priority index, a UE determines to transmit a first PUSCH of larger priority index on a serving cell, a second PUSCH of smaller priority index on the serving cell, and a transmission of the first PUSCH would overlap in time with a transmission of the second PUSCH, the UE does not transmit the second PUSCH, where at least one of the two PUSCH is not scheduled by a DCI format.

In NR Rel-16, a UE can only multiplex UCIs with same priority index in a PUCCH or a PUSCH. A PUCCH or a PUSCH is assumed to have a same priority index as a priority index of UCIs a UE multiplexes in the PUCCH or the PUSCH. For intra-UE collision between uplink channels with different priorities, the uplink channel with high priority is transmitted, and the low priority channel is dropped.

UCI multiplexing enhancement configurations and conditions are described herein. In NR, up to 8 SR can be configured. In NR Rel-16, joint HARQ-ACK and SR reporting is supported only for the same priority.

For low priority HARQ-ACK codebook, HARQ-ACK codebook with priority index 0, the PUCCH resources may be configured at slot level or subslot level. However, only one PUCCH carrying low priority HARQ-ACK can be reported in a slot. For PUCCH carrying high priority HARQ-ACK, more than 2 PUCCH transmissions may be supported in a slot.

In Rel-16, the channel dropping rule is defined so that the high priority channel is transmitted, and the low priority channel is dropped in case of channel overlapping. And dropping timelines are defined for different types of UL channels and UCI types.

In NR Rel-17, UCI multiplexing between different priorities will be supported. To separate from the Rel-16 limitation of UCI multiplexing within the same priority, one or more RRC parameters can be introduced and configured by higher layer signaling.

A new RRC configuration can be specified to allow multiplexing of UCI with different priorities on a single UL transmission (e.g., a parameter of UCImux-r17, can be configured to allow multiplexing of UCI with different priorities supported in Rel-17. The same parameter UCI-mux-r17 may be configured for both PUCCH and PUSCH.

Alternatively, separate RRC parameters can be configured for PUCCH and PUSCH. For example, a parameter of UCImux-PUCCH-r17 or multiUCI-PUCCH-r17, can be configured to allow multiplexing of UCI with different priorities on PUCCH in Rel-17. A separate parameter of UCImux-PUSCH-r17 can be configured to allow multiplexing of UCI on PUSCH with different priorities in Rel-17.

For UCI multiplexing on PUCCH, at least the following scenarios may be supported: multiplexing a high-priority HARQ-ACK and a low-priority HARQ-ACK into a PUCCH; multiplexing a low-priority HARQ-ACK and a high-priority SR into a PUCCH for some HARQ-ACK/SR PUCCH format combinations; multiplexing a low-priority HARQ-ACK, a high-priority HARQ-ACK and a high-priority SR into a PUCCH.

In general, for a high priority UCI (e.g. HARQ-ACK or SR) multiplexing with low priority UCI on a single PUCCH, the low priority PUCCH should satisfy the dropping timeline in Rel-16, so that the low priority PUCCH can be fully dropped. In other words, the report of the high priority UCI on the high PUCCH is known before the starting symbol of the low priority PUCCH for the low priority UCI. Thus, the timeline is defined based on some processing time and UE capabilities, e.g. a Tproc,2+d1 after a last symbol of the corresponding PDCCH reception. Otherwise, if the low priority PUCCH transmission is already started, the existing channel dropping method should be used, so that the high priority PUCCH is transmitted and the low priority PUCCH is dropped. Furthermore, extra processing time may be added to the dropping timeline to perform multiplexing of UCIs with different priorities. The extra processing time may be defined by a number of symbols (e.g., 1, 2, 3 symbols) depending on UE capabilities. The extra processing time may be determined by the type of UCIs with different priorities (e.g., multiplexing HARQ-ACK with different priorities may require a longer multiplexing processing time than a HARQ-ACK with SR with different priorities).

If the multiplexing timeline requirement is satisfied, multiplexing of UCI with different priorities on a single uplink channel can be performed if configured and enabled. The examples described herein provide methods for multiplexing a low-priority HARQ-ACK and a high-priority SR into a PUCCH for some HARQ-ACK/SR PUCCH format combinations. The multiplexing can be supported if the positive high priority SR is known before the starting symbol of the PUCCH for low priority HARQ-ACK.

If a UE is provided subslotLength-ForPUCCH, a slot for an associated PUCCH transmission may include a number of symbols indicated by subslotLength-For-PUCCH. A UE may be configured to transmit K PUCCHs for respective K SRs in a slot, as determined by a set of schedulingRequestResourceId and schedulingRequestIDForBFR, with SR transmission occasions that would overlap with a transmission of a PUCCH with HARQ-ACK information with priority index 0 from the UE in the slot. Among the K overlapping SRs in a slot, there are K0 SRs with priority index 0, and K1 SRs with priority index 1, where K0≥0, K1≥0, and K0+K1=K. That is, K0 low priority SRs and K1=K−K0 high priority SRs.

Different methods may be used based on different combinations of PUCCH format for HARQ-ACK and PUCCH format for SR. Joint reporting of HARQ-ACK and SR with different priorities for up to 2 bits of HARQ-ACK with PUCCH format 0 or 1 is described herein.

For no more than 2 bits of HARQ-ACK, a PUCCH format 0 or PUCCH format 1 is used. If joint reporting of HARQ-ACK and SR is supported on PUCCH format 0 or PUCCH format 1, only a single SR status can be indicated even if there are K SRs overlap with the PUCCH for HARQ-ACK. Thus, in case of multiple PUCCHs with positive SR overlap with the HARQ-ACK PUCCH, a positive SR is indicated, but the SR index of the positive SR is not reported to the gNB.

Different methods are used based on different combinations of PUCCH format for HARQ-ACK and PUCCH format for SR. Examples of joint reporting of HARQ-ACK and SR with different priorities for more than 2 bits of HARQ-ACK using PUCCH format 2/3/4 are described herein.

In NR Rel-16, a UE can only multiplex UCIs with same priority index in a PUCCH or a PUSCH. A PUCCH or a PUSCH is assumed to have a same priority index as a priority index of UCIs a UE multiplexes in the PUCCH or the PUSCH.

For no more than 2 bits of HARQ-ACK, a PUCCH format 0 or PUCCH format 1 is used. If joint reporting of HARQ-ACK and SR is supported on PUCCH format 0 or PUCCH format 1, only a single SR status can be indicated even if there are K SRs overlap with the PUCCH for HARQ-ACK. Thus, in case of multiple PUCCHs with positive SR overlap with the HARQ-ACK PUCCH, a positive SR is indicated, but the SR index of the positive SR is not reported to the gNB.

For more than 2 bits of HARQ-ACK, a PUCCH format 2 or PUCCH format 3 or PUCCH format 4 may be used. In NR, up to 8 SRs can be configured. In NR Rel-16, joint HARQ-ACK and SR reporting is supported only for the same priority. For joint HARQ-ACK and SR reporting using PUCCH format 2 or PUCCH format 3 or PUCCH format 4, the bits appended for SR is present regardless of the SR states. For a positive SR, the index of the positive is also known by the value of the added SR bits.

If a UE is provided subslotLength-ForPUCCH, a slot for an associated PUCCH transmission includes a number of symbols indicated by subslotLength-ForPUCCH. For HARQ-ACK and SR with the same priority, a UE may be configured to transmit K PUCCHs for respective K SRs in a slot, as determined by a set of schedulingRequestResourceId and schedulingRequestIDForBFR, with SR transmission occasions that would overlap with a transmission of a PUCCH with HARQ-ACK information from the UE in the slot.

If a UE would transmit a PUCCH with $O_{ACK}$ HARQ-ACK information bits in a resource using PUCCH format 2 or PUCCH format 3 or PUCCH format 4 in a slot, $\lceil \log 2(K+1) \rceil$ bits representing a negative or positive SR, in ascending order of the values of schedulingRequestResourceId and schedulingRequestID-ForBFR, are appended to the HARQ-ACK information bits and the UE transmits the combined $O_{UCI}=O_{ACK}+\lceil \log_2(K0+1) \rceil$ UCI bits in a PUCCH using a resource with PUCCH format 2 or PUCCH format 3 or PUCCH format 4 that the UE determines. If one of the SRs is a positive LRR, the value of the $\lceil \log 2(K+1) \rceil$ bits indicates the positive LRR. An all-zero value for the $\lceil \log_2(K+1) \rceil$ bits represents a negative SR value across all K SRs.

Enhancements to support low priority HARQ-ACK with high priority SR are described herein. In the following, considering SR with different priorities, a UE is configured to transmit K PUCCHs for respective K SRs in a slot, as determined by a set of schedulingRequestRe-sourceId and schedulingRequestIDForBFR, with SR transmission occasions that would overlap with a transmission of a PUCCH with HARQ-ACK information with priority index 0 from the UE in the slot. Among the K overlapping SRs in a slot, there are K0 SRs with priority index 0 and K1 SRs with priority index 1, where K0≥0, K1≥0, and K0+K1=K. That is, there are a total of K SRs with K0 low priority SRs and K1=K–K0 high priority SRs.

In NR Rel-16, a UE can only multiplex UCIs with same priority index. Thus, for a PUCCH with more than 2 bits of HARQ-ACK with priority index 0 in a resource using PUCCH format 2 or PUCCH format 3 or PUCCH format 4, only the SRs with priority index 0 are counted in the SR bits appended to the HARQ-ACK. Thus, if a UE would transmit a PUCCH with $O_{ACK}$ HARQ-ACK information bits with priority index 0 in a resource using PUCCH format 2 or PUCCH format 3 or PUCCH format 4 in a slot, $\lceil \log_2(K0+1) \rceil$ bits representing a negative or positive SR with priority index 0, in ascending order of the values of schedulingRequestRe-sourceId and schedulingRequestIDForBFR, are appended to the HARQ-ACK information bits with priority index 0 and the UE transmits the combined $O_{UCI}=O_{ACK}+\lceil \log_2(K0+1) \rceil$ UCI bits in a PUCCH with priority index 0 using a resource with PUCCH format 2 or PUCCH format 3 or PUCCH format 4 that the UE determines. If one of the SRs with low priority is a positive LRR, the value of the $\lceil \log_2(K0+1) \rceil$ bits indicates the positive LRR. An all-zero value for the $\lceil \log_2(K0+1) \rceil$ bits represents a negative SR value across K0 SRs with priority index 0.

Also in Rel-16, for intra-UE collision between uplink channels with different priorities, the uplink channel with high priority is transmitted, and the low priority channel is dropped. Thus, in case of a collision between a PUCCH with more than 2 bits of HARQ-ACK with priority index 0 in a resource using PUCCH format 2 or PUCCH format 3 or PUCCH format 4, and a PUCCH with positive SR with priority index 1, the UE transmits the PUCCH with positive SR with priority index 1, and drops the PUCCH with more than 2 bits of HARQ-ACK with priority index 0 in a resource using PUCCH format 2 or PUCCH format 3 or PUCCH format 4.

In Rel-17, if joint reporting of UCI with different priorities on PUCCH is supported, the methods for multiplexing a low-priority HARQ-ACK with more than 2 bits and a high-priority SR in a PUCCH resource using PUCCH format 2 or PUCCH format 3 or PUCCH format 4 should be specified. Several methods are described herein.

In a first method (Method 1), bits may be appended to HARQ-ACK by counting SR with all priorities together based on SR indexes. In Rel-16, for joint reporting with low priority HARQ-ACK, only the overlapping low priority SRs are counted, the number of SR bits appended to the HARQ-ACK bits is $\lceil \log_2(K0+1) \rceil$.

If multiplexing of high priority SR and low priority HARQ-ACK is supported, all overlapping SRs can be counted. Thus, the number of SR bits appended to the HARQ-ACK bits is $\lceil \log_2(K+1) \rceil$, and may be different from that with Rel-16 method. If a UE would transmit a PUCCH with $O_{ACK}$ HARQ-ACK information bits with priority index 0 in a resource using PUCCH format 2 or PUCCH format 3 or PUCCH format 4 in a slot, $\lceil \log_2(K+1) \rceil$ bits representing a negative or positive SR, in ascending order of the values of schedulingRequestResourceId and schedulingRequestID-ForBFR, are appended to the HARQ-ACK information bits with priority index 0 and the UE transmits the combined $O_{UCI}=O_{ACK}+\lceil \log_2(K+1) \rceil$ UCI bits in a PUCCH with priority index 0 using a resource with PUCCH format 2 or PUCCH format 3 or PUCCH format 4 that the UE determines. If one of the SRs is a positive LRR, the value of the $\lceil \log_2(K+1) \rceil$ bits indicates the positive LRR. An all-zero value for the $\lceil \log_2(K+1) \rceil$ bits represents a negative SR value across all K SRs.

With this method, the SR bit ordering is based on the overlapping SR indexes, so the SRs with different priorities may mixed together based on the SR index ordering. Only one positive SR can be indicated by the appended bits. Thus, if there are positive LLRs with both SR priority 1 and SR priority index 0, the value of the $\lceil \log_2(K+1) \rceil$ bits indicates the positive LRR with SR priority 1. This method requires the minimum number of bits to indicate all K overlapping SRs with different priorities with the HARQ-ACK PUCCH resource.

In a second method (Method 2), bits may be appended to HARQ-ACK by counting SRs separately based on SR indexes within each priority. If multiplexing of high priority SR and low priority HARQ-ACK is supported, all overlapping SRs can be counted. But the SRs with priority index 1 and priority index 0 may be counted separately to generate separate SR bits. Thus, $\lceil \log_2(K+1) \rceil$ bits represent a negative or positive SR with priority index 1, and $\lceil \log_2(K0+1) \rceil$ bits represent a negative or positive SR with priority index 0, where K1+K0=K. The total number of bits representing SRs appended to the HARQ-ACK bits is $\lceil \log_2(K1+1) \rceil + \lceil \log_2(K0+1) \rceil$, and may be different from and may be larger than that with Rel-16 method or Method 1.

In one approach, the bits representing low priority SRs are appended to the HARQ-ACK with priority index 0 first, followed by the bits representing high priority SRs. Thus, if a UE would transmit a PUCCH with $O_{ACK}$ HARQ-ACK information bits with priority index 0 in a resource using PUCCH format 2 or PUCCH format 3 or PUCCH format 4 in a slot, $\lceil \log_2(K0+1) \rceil$ bits representing a negative or positive SR with priority index 0, in ascending order of the values of schedulingRequestResourceId and schedulingRequestID-ForBFR, and $\lceil \log_2(K1+1) \rceil$ bits representing a negative or positive SR with priority index 1, in ascending order of the values of schedulingRequestResourceId and schedulingRequestIDForBFR, are appended to the HARQ-ACK information bits with priority index 0 and the UE transmits the combined $O_{UCI}=O_{ACK}+\lceil \log_2(K0+1)\rceil+\lceil \log_2(K1+1)\rceil$ UCI bits in a PUCCH with priority index 0 using a resource with PUCCH format 2 or PUCCH format 3 or PUCCH format 4 that the UE determines.

If one of the SRs with priority index 0 is a positive LRR, the value of the $\lceil \log_2(K0+1)\rceil$ bits indicates the positive LRR within the SRs with priority index 0. An all-zero value for the $\lceil \log_2(K0+1)\rceil$ bits represents a negative SR value across all K0 SRs with priority index 0. If one of the SRs with priority index 1 is a positive LRR, the value of the $\lceil \log_2(K1+1)\rceil$ bits indicates the positive LRR within SRs with priority index 1. An all-zero value for the $\lceil \log_2(K1+1)\rceil$ bits represents a negative SR value across all K1 SRs with priority index 1. This approach maintains the SR bits and position for low priority SRs, and extra bits for high priority SRs are appended after the bits for low priority SR.

In another approach, the bits representing high priority SRs are appended to the HARQ-ACK with priority index 0 first, followed by the bits representing low priority SRs. Thus, if a UE would transmit a PUCCH with $O_{ACK}$ HARQ-ACK information bits with priority index 0 in a resource using PUCCH format 2 or PUCCH format 3 or PUCCH format 4 in a slot, $\lceil \log_2(K1+1)\rceil$ bits representing a negative or positive SR with priority index 1, in ascending order of the values of schedulingRequestResourceId and schedulingRequestIDForBFR, and $\lceil \log_2(K0+1)\rceil$ bits representing a negative or positive SR with priority index 0, in ascending order of the values of schedulingRequestResourceId and schedulingRequestIDForBFR, are appended to the HARQ-ACK information bits with priority index 0 and the UE transmits the combined $O_{UCI}=O_{ACK}+\lceil \log_2(K1+1)\rceil+\lceil \log_2(K0+1)\rceil$ UCI bits in a PUCCH with priority index 0 using a resource with PUCCH format 2 or PUCCH format 3 or PUCCH format 4 that the UE determines.

If one of the SRs with priority index 1 is a positive LRR, the value of the $\lceil \log_2(K1+1)\rceil$ bits indicates the positive LRR within the SRs with priority index 1. An all-zero value for the $\lceil \log_2(K1+1)\rceil$ bits represents a negative SR value across all K1 SRs with priority index 1. If one of the SRs with priority index 0 is a positive LRR, the value of the $\lceil \log_2(K0+1)\rceil$ bits indicates the positive LRR within the SRs with priority index 0. An all-zero value for the $\lceil \log_2(K0+1)\rceil$ bits represents a negative SR value across all K0 SRs with priority index 0. This approach changes the SR bits and position for low priority SRs, extra bits for high priority SRs are appended after HARQ-ACK information bits and before the bits for low priority SR.

With this method, one positive SR within each priority can be indicated. Thus, if there are positive LLRs with both SR priority 1 and SR priority index 0, two positive SRs can be indicated independently and simultaneously within the corresponding bits representing the SR of the given priority. This method may require more bits to indicate K overlapping SRs with different priorities with the HARQ-ACK PUCCH resource, i.e. a total of $\lceil \log_2(K1+1)\rceil+\lceil \log_2(K0+1)\rceil$ bits are added to the HARQ-ACK as compared with $\lceil \log_2(K+1)\rceil$ bit in Method 1.

In a third method (Method 3), bits may be prepended to HARQ-ACK for SRs with high priority and bits may be appended to HARQ-ACK for SRs with low priority. In both Method 1 and Method 2 above, SR bits are added after HARQ-ACK regardless of SR priorities. In another method, the HARQ-ACK and SR with the same priority (e.g., low priority in this case) may be multiplexed first, and then SR with high priority is multiplexed with priority ordering.

Thus, with Method 3, since SR with priority index 1 is considered with higher priority than the HARQ-ACK with priority index 0, the $\lceil \log_2(K1+1)\rceil$ bits representing a negative or positive SR with priority index 1 is prepended to the HARQ-ACK information bits, and the $\lceil \log_2(K0+1)\rceil$ bits representing a negative or positive SR with priority index 0 is appended to the HARQ-ACK information bits with priority index 0, where K1+K0=K. Thus, If a UE would transmit a PUCCH with $O_{ACK}$ HARQ-ACK information bits with priority index 0 in a resource using PUCCH format 2 or PUCCH format 3 or PUCCH format 4 in a slot, and $\lceil \log_2(K1+1)\rceil$ bits representing a negative or positive SR with priority index 1, in ascending order of the values of schedulingRequestResourceId and schedulingRequestID-ForBFR, are prepended to the HARQ-ACK information bits with priority index 0, and $\lceil \log_2(K0+1)\rceil$ bits representing a negative or positive SR with priority index 0, in ascending order of the values of schedulingRequestResourceId and schedulingRequestID-ForBFR, are appended to the HARQ-ACK information bits with priority index 0, and the UE transmits the combined $O_{UCI}=\lceil \log_2(K1+1)\rceil+O_{ACK}+\lceil \log_2(K0+1)\rceil$ UCI bits in a PUCCH with priority index 0 using a resource with PUCCH format 2 or PUCCH format 3 or PUCCH format 4 that the UE determines.

If one of the SRs with priority index 1 is a positive LRR, the value of the $\lceil \log_2(K1+1)\rceil$ bits indicates the positive LRR within the SRs with priority index 1. An all-zero value for the $\lceil \log_2(K1+1)\rceil$ bits represents a negative SR value across all K1 SRs with priority index 1. If one of the SRs with priority index 0 is a positive LRR, the value of the $\lceil \log_2(K0+1)\rceil$ bits indicates the positive LRR within the SRs with priority index 0. An all-zero value for the $\lceil \log_2(K0+1)\rceil$ bits represents a negative SR value across all K0 SRs with priority index 0. This approach maintains the SR bits and position for low priority SRs, and extra bits for high priority SRs are prepend to the HARQ-ACK information bits.

Again, with this method, one positive SR within each priority can be indicated. Thus, if there are positive LLRs with both SR priority 1 and SR priority index 0, two positive SRs can be indicated independently within the corresponding bits representing the SR of the given priority.

As with Method 2, this method may require more bits to indicate K overlapping SRs with different priorities with the HARQ-ACK PUCCH resource. For example, a total of $\lceil \log_2(K1+1)\rceil+\lceil \log_2(K0+1)\rceil$ bits may be added to the HARQ-ACK as compared with $\lceil \log_2(K+1)\rceil$ bit in Method 1.

In a fourth method (Method 4), bits may be appended or prepended to HARQ-ACK by counting SRs with high priorities only. Since SR with priority index 1 is considered with higher priority than SR with priority index 0, the SRs with priority index 0 are dropped if there is SR with priority index 1 in the overlapping SRs. Therefore, if K1>0, the $\lceil \log_2(K1+1)\rceil$ bits representing a negative or positive SR with priority index 1 is multiplexed to the HARQ-ACK information bits with priority index 0.

In one approach, the $\lceil \log_2(K1+1) \rceil$ bits representing a negative or positive SR with priority index 1 are appended to the HARQ-ACK information bits with priority index 0. This maintains the order of HARQ-ACK information bits before SR bits.

If a UE would transmit a PUCCH with $O_{ACK}$ HARQ-ACK information bits with priority index 0 in a resource using PUCCH format 2 or PUCCH format 3 or PUCCH format 4 in a slot, and $\lceil \log_2(K1+1) \rceil$ bits representing a negative or positive SR with priority index 1, in ascending order of the values of schedulingRequestResourceId and schedulingRequestID-ForBFR, are appended to the HARQ-ACK information bits with priority index 0, and the UE transmits the combined $O_{UCI}=O_{ACK}+\lceil \log_2(K1+1) \rceil$ UCI bits in a PUCCH with priority index 0 using a resource with PUCCH format 2 or PUCCH format 3 or PUCCH format 4 that the UE determines. If one of the SRs with priority index 1 is a positive LRR, the value of the $\lceil \log_2(K1+1) \rceil$ bits indicates the positive LRR within the SRs with priority index 1. An all-zero value for the $\lceil \log_2(K1+1) \rceil$ bits represents a negative SR value across all K1 SRs with priority index 1.

In another approach, the $\lceil \log_2(K1+1) \rceil$ bits representing a negative or positive SR with priority index 1 is prepended to the HARQ-ACK information bits with priority index 0. This is also reasonable because the SR with priority index 1 has higher priority than the HARQ-ACK information bits with priority index 0.

If a UE would transmit a PUCCH with $O_{ACK}$ HARQ-ACK information bits with priority index 0 in a resource using PUCCH format 2 or PUCCH format 3 or PUCCH format 4 in a slot, and $\lceil \log_2(K1+1) \rceil$ bits representing a negative or positive SR with priority index 1, in ascending order of the values of schedulingRequestResourceId and schedulingRequestID-ForBFR, are prepended to the HARQ-ACK information bits with priority index 0, and the UE transmits the combined $O_{UCI}=\lceil \log_2(K1+1) \rceil+O_{ACK}$ UCI bits in a PUCCH with priority index 0 using a resource with PUCCH format 2 or PUCCH format 3 or PUCCH format 4 that the UE determines. If one of the SRs with priority index 1 is a positive LRR, the value of the $\lceil \log_2(K1+1) \rceil$ bits indicates the positive LRR within the SRs with priority index 1. An all-zero value for the $\lceil \log_2(K1+1) \rceil$ bits represents a negative SR value across all K1 SRs with priority index 1.

Method 4 reports only high priority SR if there are overlapping SR resources for both high priority SR and low priority SR. Thus, the SR with priority index 0 is disabled if there is any overlapping SR with priority index 1 regardless the SR has a positive or negative state. However, if there is a positive low priority SR and negative high priority SR, the positive low priority SR cannot be reported. This may cause loss of low priority SR triggering.

In a fifth method (Method 5), additional enhancement may be provided by power boosting for positive high priority SR. For all methods 1-4 above, all SRs bits are reported regardless of positive or negative SR states. Additional enhancement can be considered to differentiate positive high priority SR and positive low priority SR. Thus, if a positive SR with priority index 1 is reported with HARQ- ACK with priority index 0, power boosting on the PUCCH transmission may be used to enhance the indication of a positive high priority SR.

The PUCCH resources with different priorities may be configured with different PUCCH configurations (e.g., PUCCH-Config). For example, the high priority SR may be configured with higher transmit power than the PUCCH for low priority HARQ-ACK or low priority SR. Thus, reporting of positive high priority SR can be further enhanced by applying different transmit powers on the PUCCH transmission for HARQ-ACK using PUCCH format 2 or PUCCH format 3 or PUCCH format 4.

In one approach, the transmit power parameters of PUCCH-Config for the high priority PUCCH resource is applied on the low priority HARQ-ACK PUCCH resource if positive high priority SR is reported.

In another approach, a new parameter can be configured by high layer signaling (e.g., by RRC configuration) to specify the required power boosting to the low priority HARQ-ACK PUCCH transmission if positive high priority SR is reported. The power boosting value may be configured in dBs (e.g., 1 dB, 2 dB or 3 dB) over the configured transmit power for the low priority HARQ-ACK PUCCH. For example, the gNB may transmit, by using higher layer signaling, information used for indicating a value used for boosting the transmission power for high priority SR.

In a sixth method (Method 6), a PUCCH resource may be selected for high priority HARQ-ACK to jointly report low priority HARQ-ACK and positive high priority SR. All methods 1-4 requires changes on the existing HARQ-ACK and SR multiplexing by appending or prepending SR bits for high priority SR while keeping or removing the SR bits for low priority. These will cause very different UE behaviors for different scenarios. Even if there is no positive high priority SR, the multiplexing method for low priority HARQ-ACK with SR will be changed.

In another method, priority inheritance can be introduced. If a positive high priority SR is triggered with SR PUCCH overlaps with only low priority HARQ-ACK PUCCH. The low priority HARQ-ACK is promoted to high priority by the positive high priority SR. Thus, the UE may choose a high priority PUCCH resource configured for high priority HARQ-ACK to report the low priority HARQ-ACK and the high priority SRs. Thus, the current multiplexing method may be kept for HARQ-ACK and SR with the same priority if there is no positive high priority SR.

If there is no positive high priority SR among overlapping SR PUCCHs with the low priority HARQ-ACK PUCCH, then the low priority HARQ-ACK is multiplexed with only SRs with the same priority (e.g., SR with priority index 0). Thus, if there is no positive SR among the K1 overlapping SRs with priority index 1 in the slot, and if a UE would transmit a PUCCH with $O_{ACK}$ HARQ-ACK information bits with priority index 0 in a resource using PUCCH format 2 or PUCCH format 3 or PUCCH format 4 in a slot, $\lceil \log_2(K0+1) \rceil$ bits representing a negative or positive SR with priority index 0, in ascending order of the values of schedulingRequestResourceId and schedulingRequestID-ForBFR, are appended to the HARQ-ACK information bits with priority index 0 and the UE transmits the combined $O_{UCI}=O_{ACK}+\lceil \log_2(K0+1) \rceil$ UCI bits in a PUCCH with priority index 0 using a resource with PUCCH format 2 or PUCCH format 3 or PUCCH format 4 that the UE determines. If one of the SRs with low priority is a positive LRR, the value of the $\lceil \log_2(K0+1) \rceil$ bits indicates the positive LRR. An all-zero value for the $\lceil \log_2(K0+1) \rceil$ bits represents a negative SR value across K0 SRs with priority index 0.

If positive high priority SR is triggered among overlapping SR PUCCHs with low priority HARQ-ACK PUCCH, the low priority HARQ-ACK is promoted to high priority by the positive high priority SR. Thus, the UE may choose a high priority PUCCH resource configured for high priority HARQ-ACK to report the low priority HARQ-ACK and the high priority SRs.

Since the HARQ-ACK payload is more than 2 bits, a high priority PUCCH resource using PUCCH format 2 or PUCCH format 3 or PUCCH format 4 can be selected from the PUCCH resources sets configured for high priority HARQ-ACK. The high priority PUCCH resource can be selected from the configured high priority PUCCH resource set based on the same PUCCH resource indication, e.g. ARI indication in the DCI.

The selected high priority PUCCH resource may be in the same slot or subslot as the low priority PUCCH resource with PUCCH format 0. The selected high priority PUCCH resource may start in the same slot or subslot as the low priority PUCCH resource with PUCCH format 0.

Extra bits representing the overlapping high priority SRs are appended to the low priority HARQ-ACK bits. The low priority SRs are not counted and should be dropped regardless positive or negative states. The number of bits can be determined by $\lceil \log_2(K1+1) \rceil$, where K1 is the number of overlapping SR PUCCH with high priority based on the original PUCCH resource for low priority HARQ-ACK.

In one approach, the HARQ-ACK and SR multiplexing method for the same priority is applied for joint reporting of the low priority HARQ-ACK and high priority SRs assuming the low priority HARQ-ACK as high priority.

If there is positive SR among the K1 overlapping SRs with priority index 1 in the slot, and if a UE would transmit a PUCCH with $O_{ACK}$ HARQ-ACK information bits with priority index 0 in a resource using PUCCH format 2 or PUCCH format 3 or PUCCH format 4 with priority index 0 in a slot, the UE would transmit a PUCCH with $O_{ACK}$ HARQ-ACK information bits with priority index 0, and $\lceil \log_2(K1+1) \rceil$ bits representing a positive SR with priority index 1, in ascending order of the values of schedulingRequestResourceId and schedulingRequestIDForBFR, are appended to the HARQ-ACK information bits with priority index 0, and the UE transmits the combined $O_{UCI}=O_{ACK}+\lceil \log_2(K1+1) \rceil$ UCI bits in a PUCCH with priority index 1 using a resource with PUCCH format 2 or PUCCH format 3 or PUCCH format 4 that the UE determines. The value of the $\lceil \log_2(K1+1) \rceil$ bits indicates the positive LRR within the SRs with priority index 1.

In another approach, the $\lceil \log_2(K1+1) \rceil$ bits representing a negative or positive SR with priority index 1 are prepended to the HARQ-ACK information bits with priority index 0. This is also reasonable because the SR with priority index 1 has higher priority than the HARQ-ACK information bits with priority index 0.

If there is positive SR among the K1 overlapping SRs with priority index 1 in the slot, and if a UE would transmit a PUCCH with $O_{ACK}$ HARQ-ACK information bits with priority index 0 in a resource using PUCCH format 2 or PUCCH format 3 or PUCCH format 4 with priority index 0 in a slot, the UE would transmit a PUCCH with $O_{ACK}$ HARQ-ACK information bits with priority index 0, and $\lceil \log_2(K1+1) \rceil$ bits representing a positive SR with priority index 1, in ascending order of the values of schedulingRequestResourceId and schedulingRequestIDForBFR, are prepended to the HARQ-ACK information bits with priority index 0, and the UE transmits the combined $O_{UCI}=\lceil \log_2(K1+1) \rceil+O_{ACK}$ UCI bits in a PUCCH with priority index 1 using a resource with PUCCH format 2 or PUCCH format 3 or PUCCH format 4 that the UE determines. The value of the $\lceil \log_2(K1+1) \rceil$ bits indicates the positive LRR within the SRs with priority index 1.

Thus, the HARQ-ACK PUCCH selection between high priority PUCCH resource and low priority PUCCH resource represents the presence of positive high priority SR. The index of the positive high priority SR is given by the bits appended or prepended to the low priority HARQ-ACK bits. With this method, the current HARQ-ACK and SR multiplexing method is unchanged if there is no overlapping positive SR with priority index 1.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162, and a gNB operations module 182. For example, one or more reception and/or transmission paths may be implemented in a gNB 160. For convenience, only a single transceiver 176, decoder 166, demodulator 172, encoder 109, and modulator 113 are illustrated in the gNB 160, though multiple parallel elements (e.g., transceivers 176, decoders 166, demodulators 172, encoders 109, and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
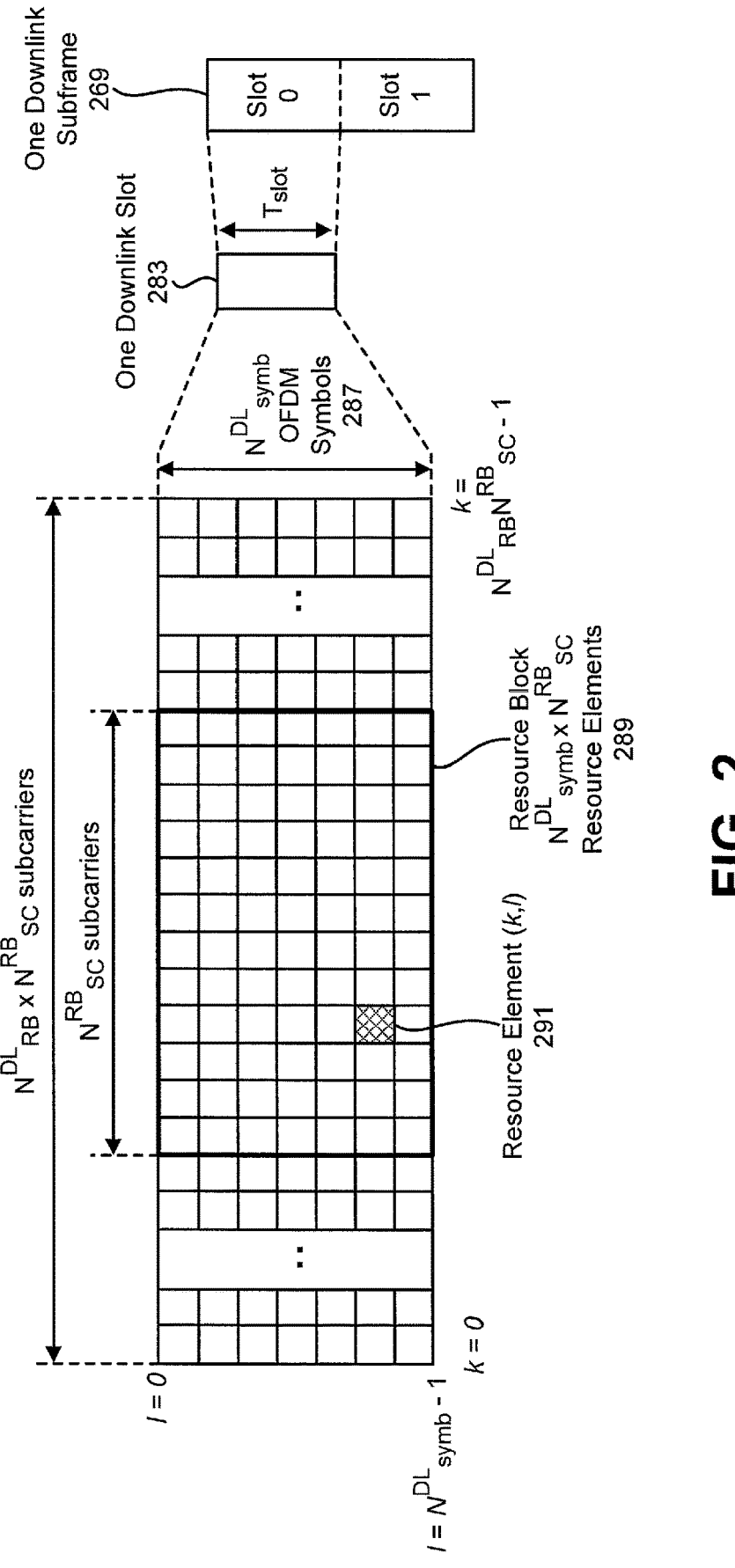
FIG. 2 is a diagram illustrating an example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For a SCell (including a Licensed Assisted Access (LAA) SCell), $N^{DL}_{RB}$ is configured by a RRC message dedicated to a UE 102. For PDSCH mapping, the available RE 291 may be the RE 291 whose index 1 fulfils $1 \geq 1_{data,start}$ and/or $1_{data,end} \geq 1$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and 1 are indices in the frequency and time domains, respectively. While downlink subframes in one component carrier (CC) are discussed herein, downlink subframes are defined for each CC and downlink subframes are substantially in synchronization with each other among CCs.

Figure 3:
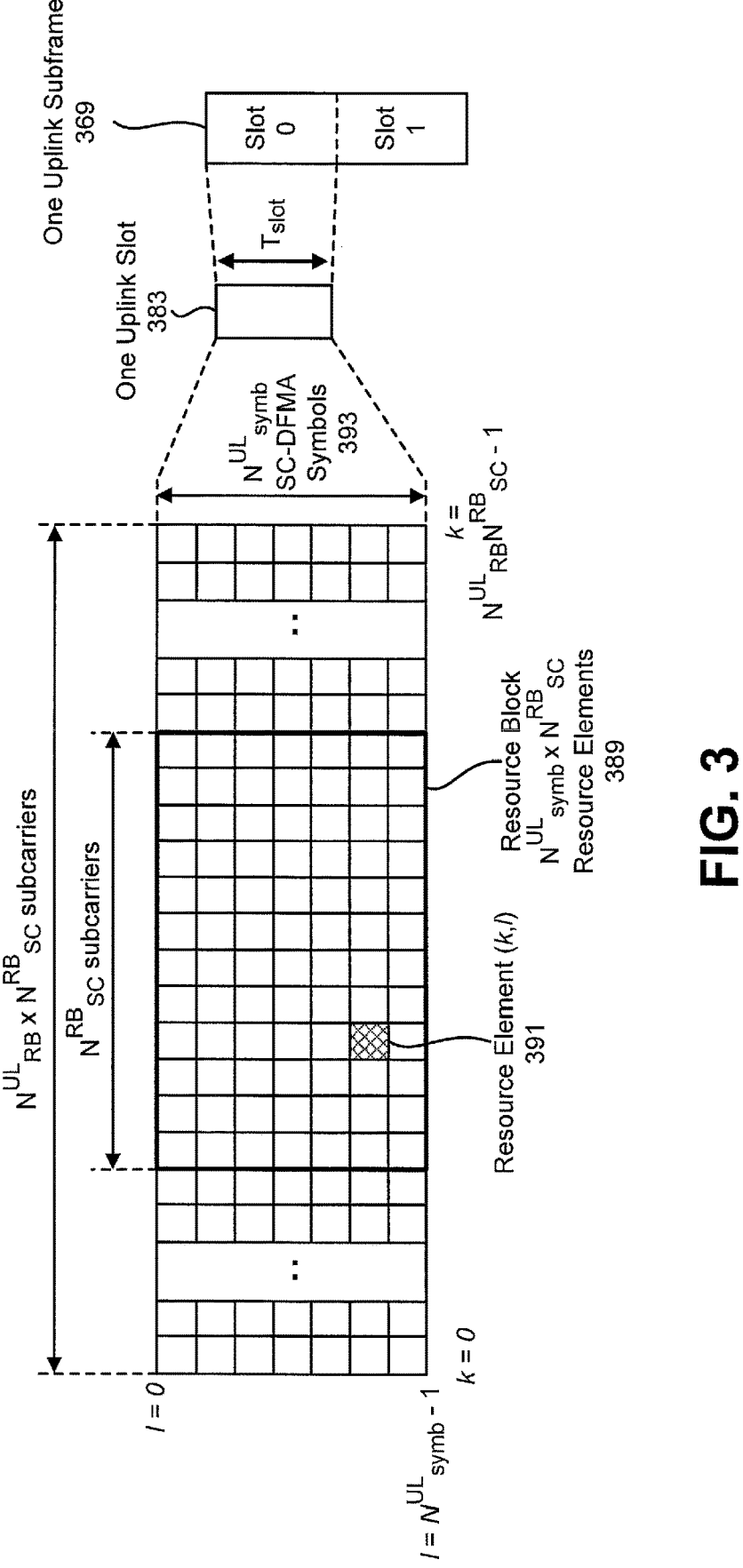
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For a SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM and/or DFT-S-OFDM symbols in time domain. A region defined by one sub-carrier in the frequency domain and one OFDM and/or DFT-S-OFDM symbol in the time domain is referred to as a RE and is uniquely identified by the index pair (k,l) in a slot, where k and 1 are indices in the frequency and time domains respectively. While uplink subframes in one component carrier (CC) are discussed herein, uplink subframes are defined for each CC.

Figure 4:
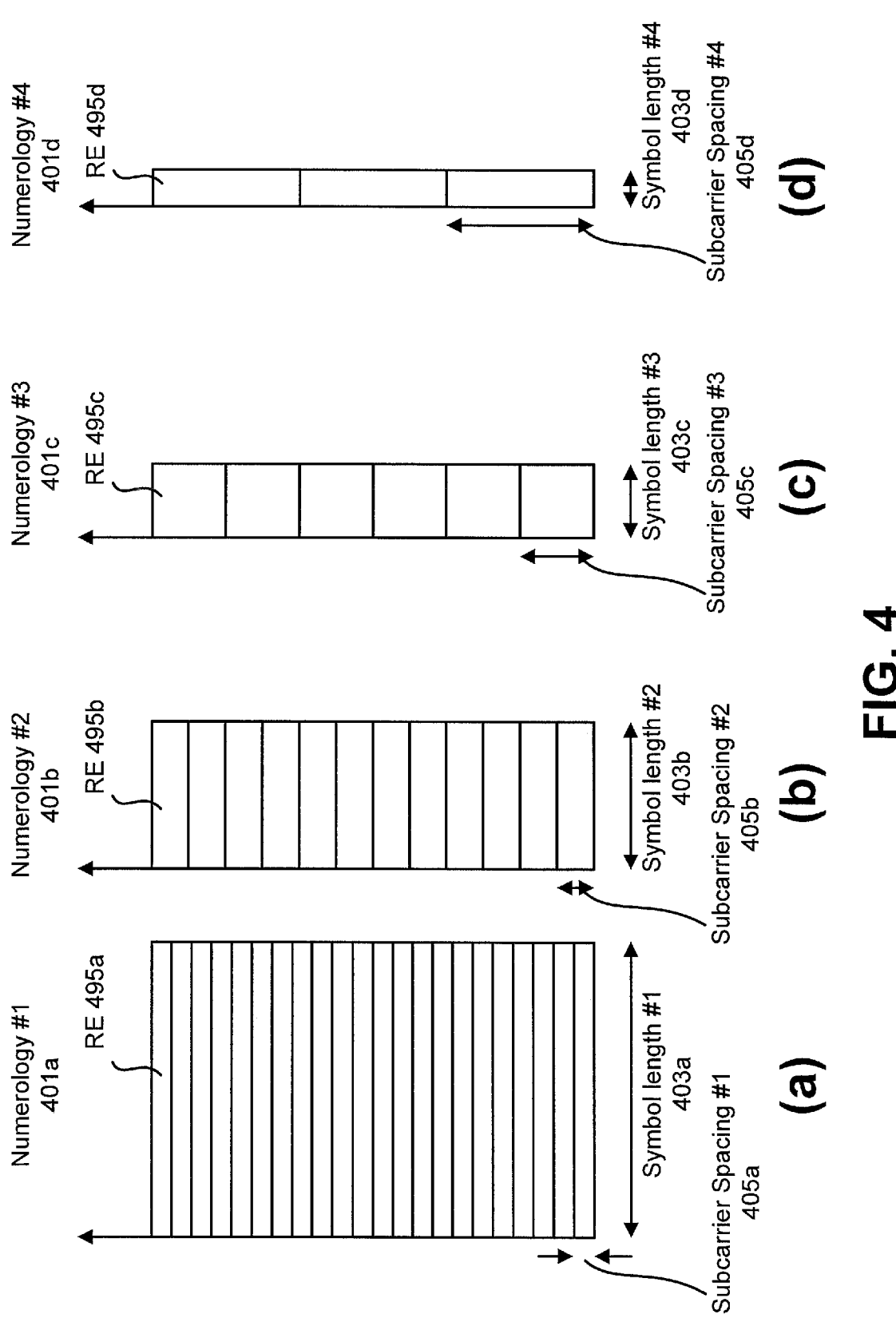
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048 Ts+CP length (e.g., 160 Ts or 144 Ts) in time domain (i.e., symbol length #1 403a), where Ts denotes a baseband sampling time unit defined as 1/(15000*2048) seconds. For the i-th numerology, the subcarrier spacing 405 may be equal to 15*2$^i$ and the effective OFDM symbol length 2048*2$^{-i}$*Ts. It may cause the symbol length is 2048*2$^{-i}$*Ts+CP length (e.g., 160*2$^{-i}$*Ts or 144*2$^{-i}$*Ts). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). In some examples, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. In some examples, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. In some examples, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. For instance, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 5:
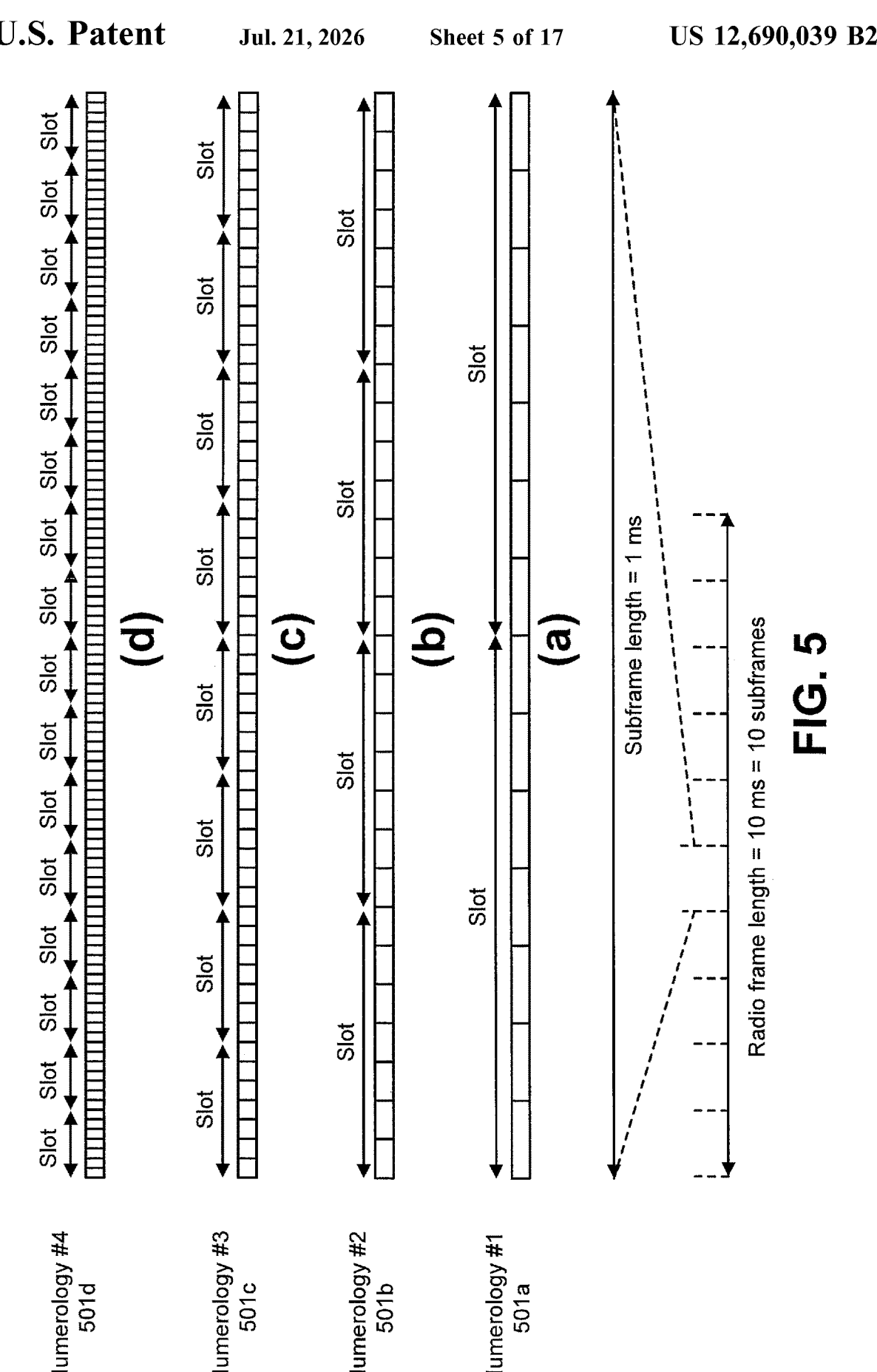
FIG. 5 shows examples of subframe structures for the numerologies that are shown in FIG. 4.

FIG. 5 shows examples of subframe structures for the numerologies 501 that are shown in FIG. 4. Given that a slot 283 includes $N^{DL}_{symb}$ (or $N^{UL}_{symb}$)=7 symbols, the slot length of the i+1-th numerology 501 is a half of the one for the i-th numerology 501, and eventually the number of slots 283 in a subframe (i.e., 1 ms) becomes double. It may be noted that a radio frame may include 10 subframes, and the radio frame length may be equal to 10 ms.

Figure 6:
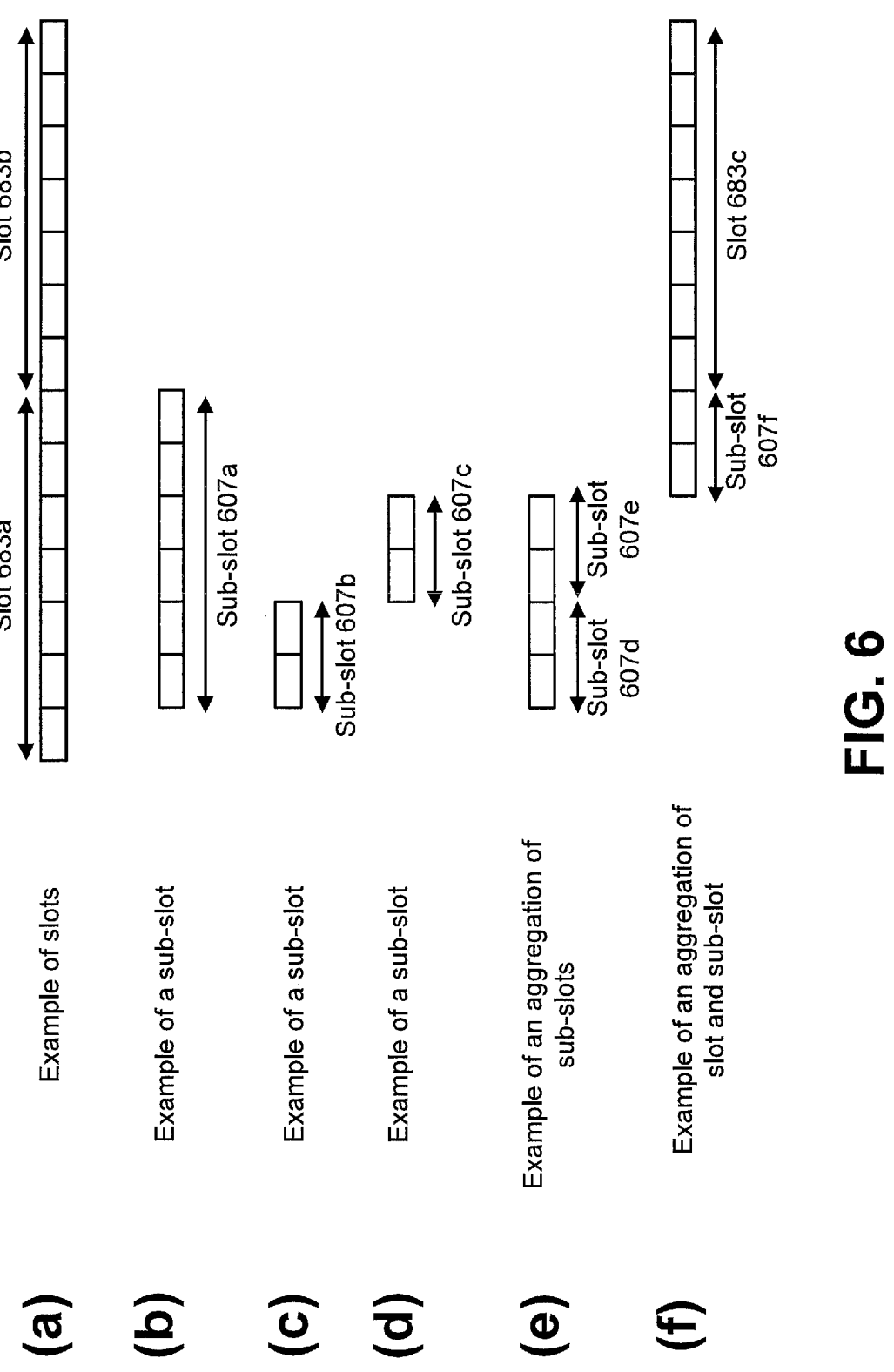
FIG. 6 shows examples of slots and sub-slots.

FIG. 6 shows examples of slots 683 and sub-slots 607. If a sub-slot 607 is not configured by higher layer, the UE 102 and the eNB and/or gNB 160 may only use a slot 683 as a scheduling unit. More specifically, a given transport block may be allocated to a slot 683. If the sub-slot 607 is configured by higher layer, the UE 102 and the eNB and/or gNB 160 may use the sub-slot 607 as well as the slot 683. The sub-slot 607 may include one or more OFDM symbols. The maximum number of OFDM symbols that constitute the sub-slot 607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 607 may start at any symbol within a slot 683 unless it collides with a control channel. There could be restrictions of mini-slot length based on restrictions on starting position. For example, the sub-slot 607 with the length of $N^{DL}_{symb}-1$ (or $N^{UL}_{symb}-1$) may start at the second symbol in a slot 683. The starting position of a sub-slot 607 may be indicated by a physical layer control channel (e.g., by DCI format). Alternatively, the starting position of a sub-slot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 607.

In cases when the sub-slot 607 is configured, a given transport block may be allocated to either a slot 683, a sub-slot 607, aggregated sub-slots 607 or aggregated sub-slot(s) 607 and slot 683. This unit may also be a unit for HARQ-ACK bit generation.

Figure 7:
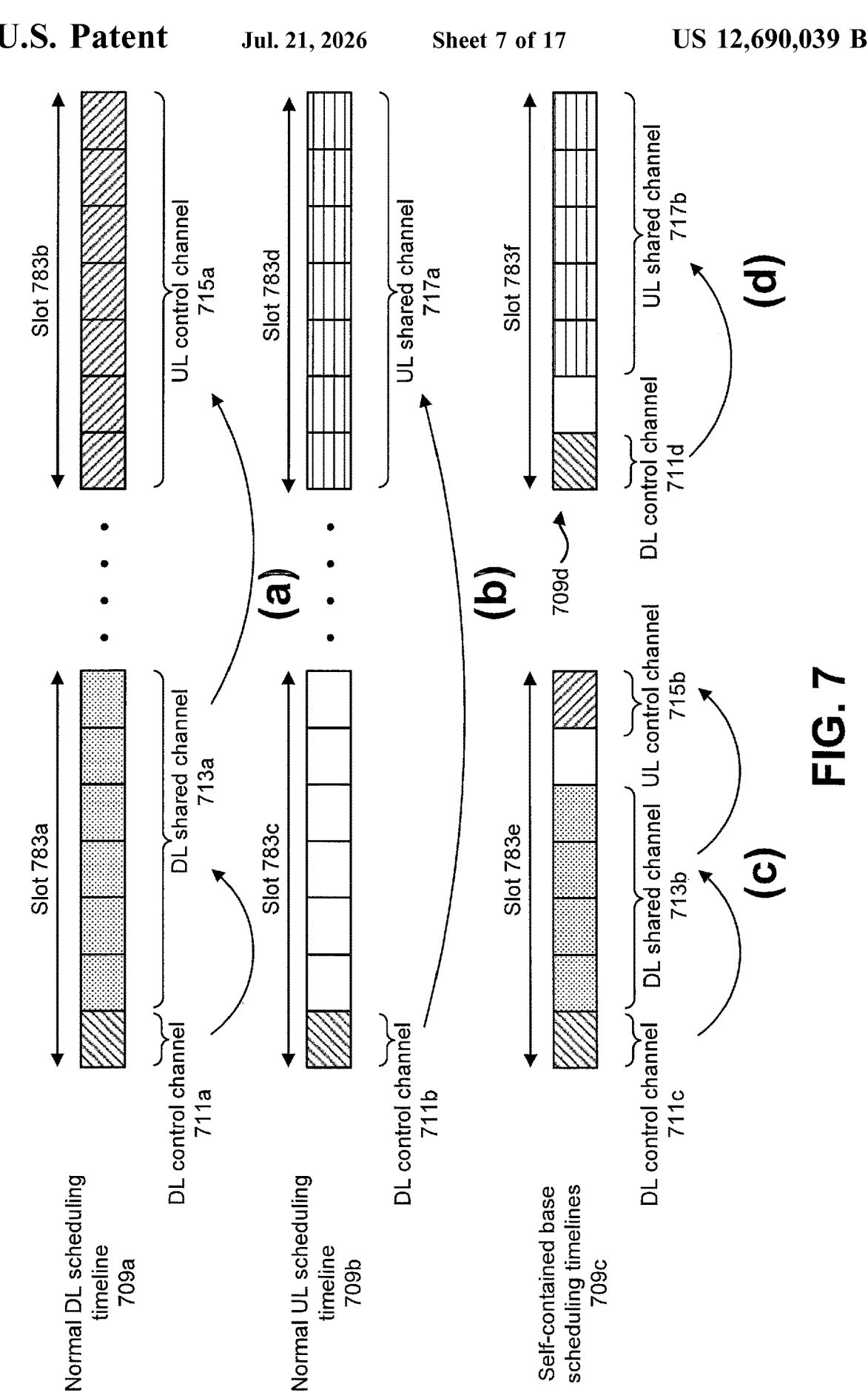
FIG. 7 shows examples of scheduling timelines.

FIG. 7 shows examples of scheduling timelines 709. For a normal DL scheduling timeline 709*a*, DL control channels are mapped the initial part of a slot 783*a*. The DL control channels 711 schedule DL shared channels 713*a* in the same slot 783*a*. HARQ-ACKs for the DL shared channels 713*a* (i.e., HARQ-ACKs each of which indicates whether or not transport block in each DL shared channel 713*a* is detected successfully) are reported via UL control channels 715*a* in a later slot 783*b*. In this instance, a given slot 783 may contain either one of DL transmission and UL transmission.

For a normal UL scheduling timeline 709*b*, DL control channels 711*b* are mapped the initial part of a slot 783*c*. The DL control channels 711*b* schedule UL shared channels 717*a* in a later slot 783*d*. For these cases, the association timing (time shift) between the DL slot 783*c* and the UL slot 783*d* may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709*c*, DL control channels 711*c* are mapped to the initial part of a slot 783*e*. The DL control channels 711*c* schedule DL shared channels 713*b* in the same slot 783*e*. HARQ-ACKs for the DL shared channels 713*b* are reported in UL control channels 715*b*, which are mapped at the ending part of the slot 783*e*.

For a self-contained base UL scheduling timeline 709*d*, DL control channels 711*d* are mapped to the initial part of a slot 783*f*. The DL control channels 711*d* schedule UL shared channels 717*b* in the same slot 783*f*. For these cases, the slot 783*f* may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 8:
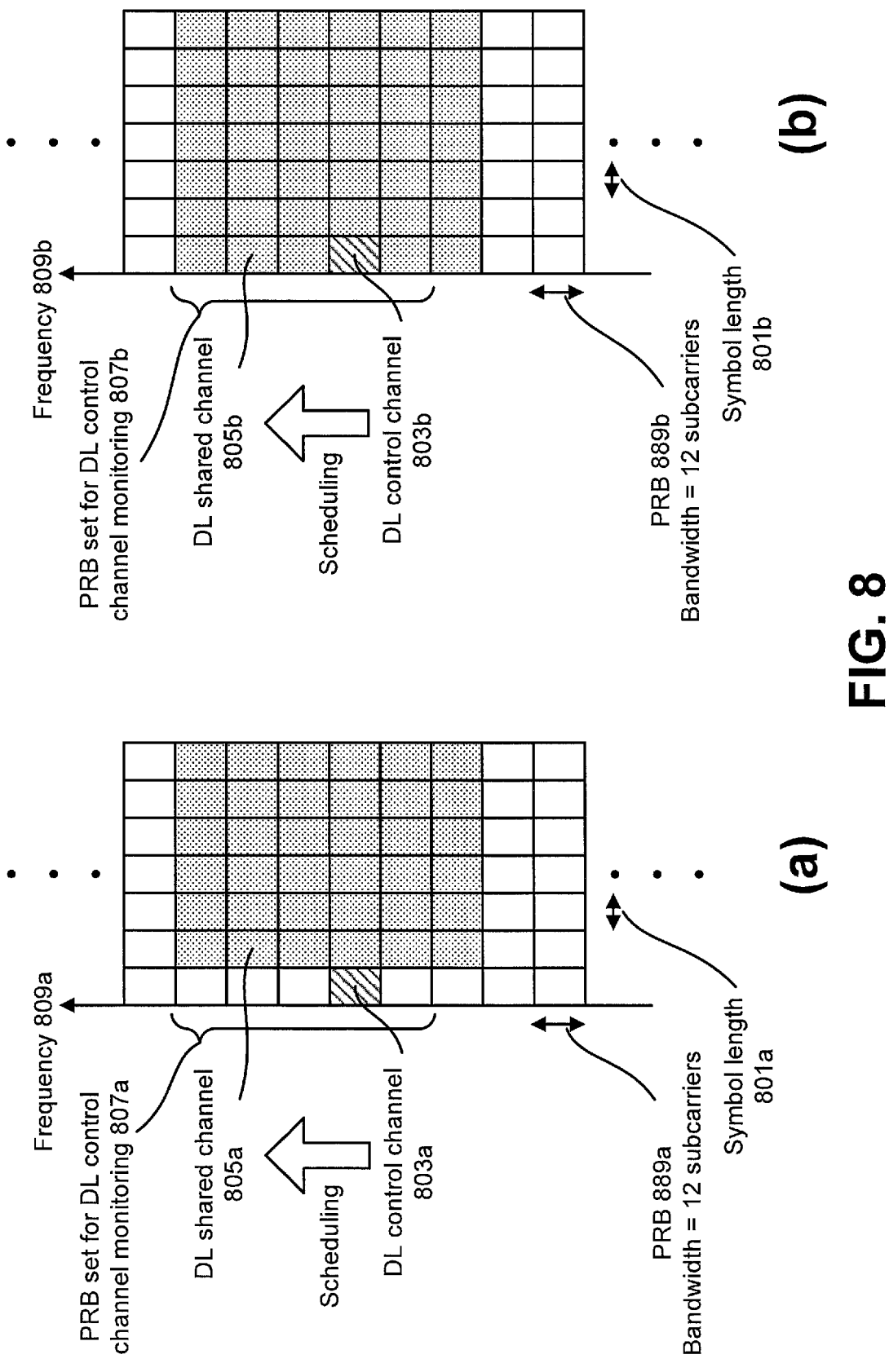
FIG. 8 shows examples of DL control channel monitoring regions.

FIG. 8 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DMRS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 9:
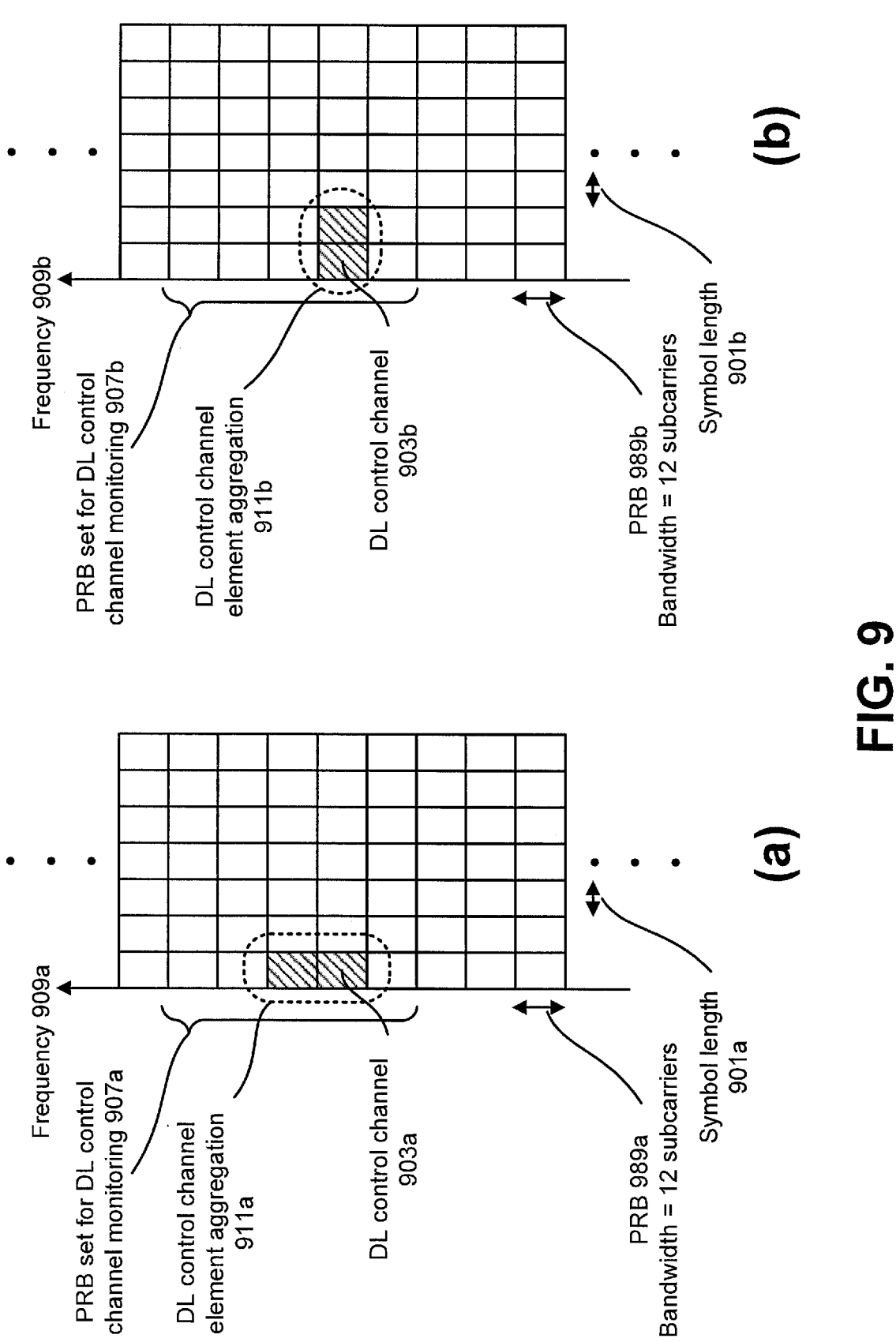
FIG. 9 shows examples of DL control channel which includes more than one control channel elements.

FIG. 9 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, for instance multiple DL control channel elements within an OFDM symbol are aggregated. Otherwise, DL control channel elements in different OFDM symbols can be aggregated.

Figure 10:
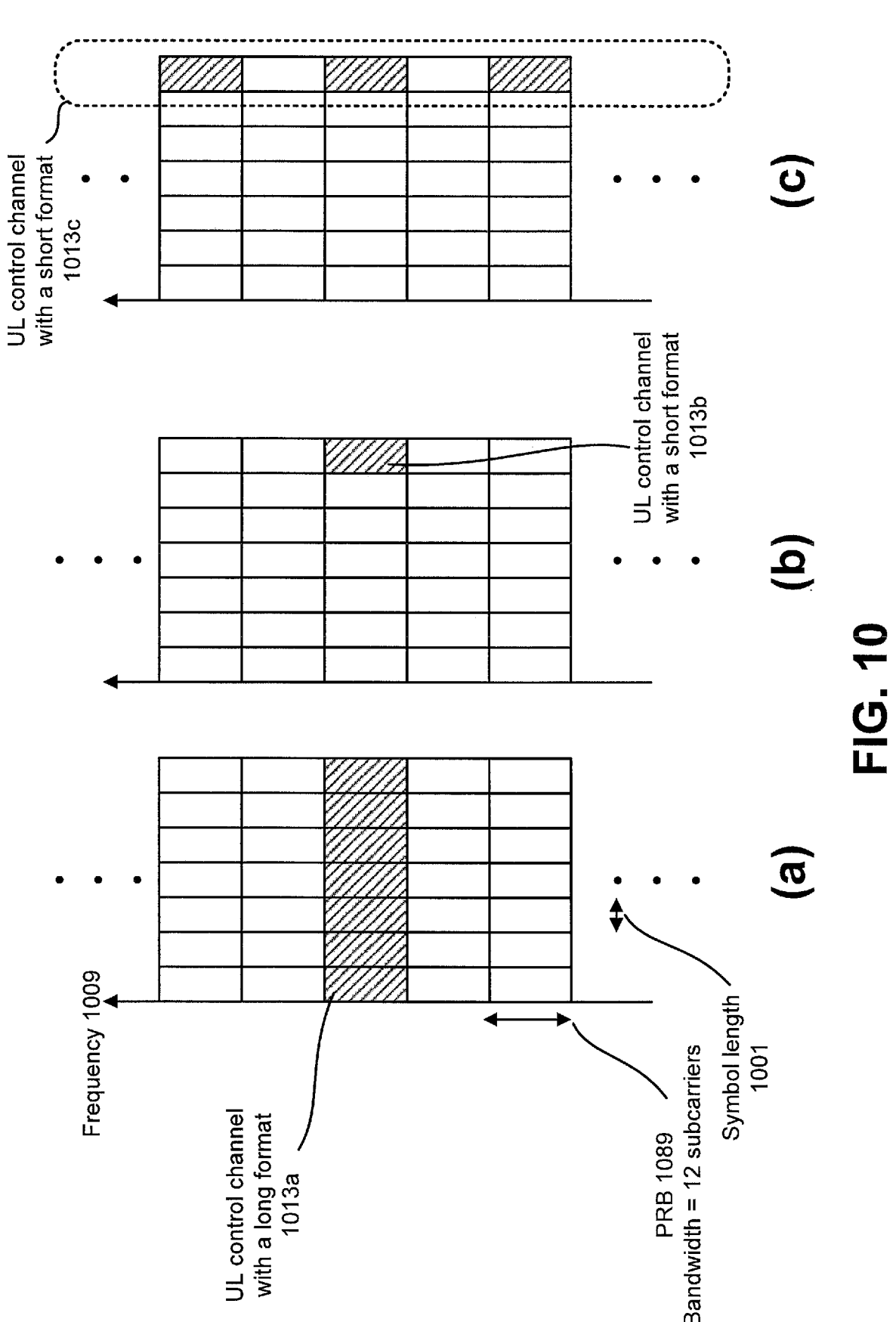
FIG. 10 shows examples of UL control channel structures.

FIG. 10 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, for instance the UL control channel may be mapped to every N PRBs (e.g., 5 or 10) within a system bandwidth.

Figure 11:
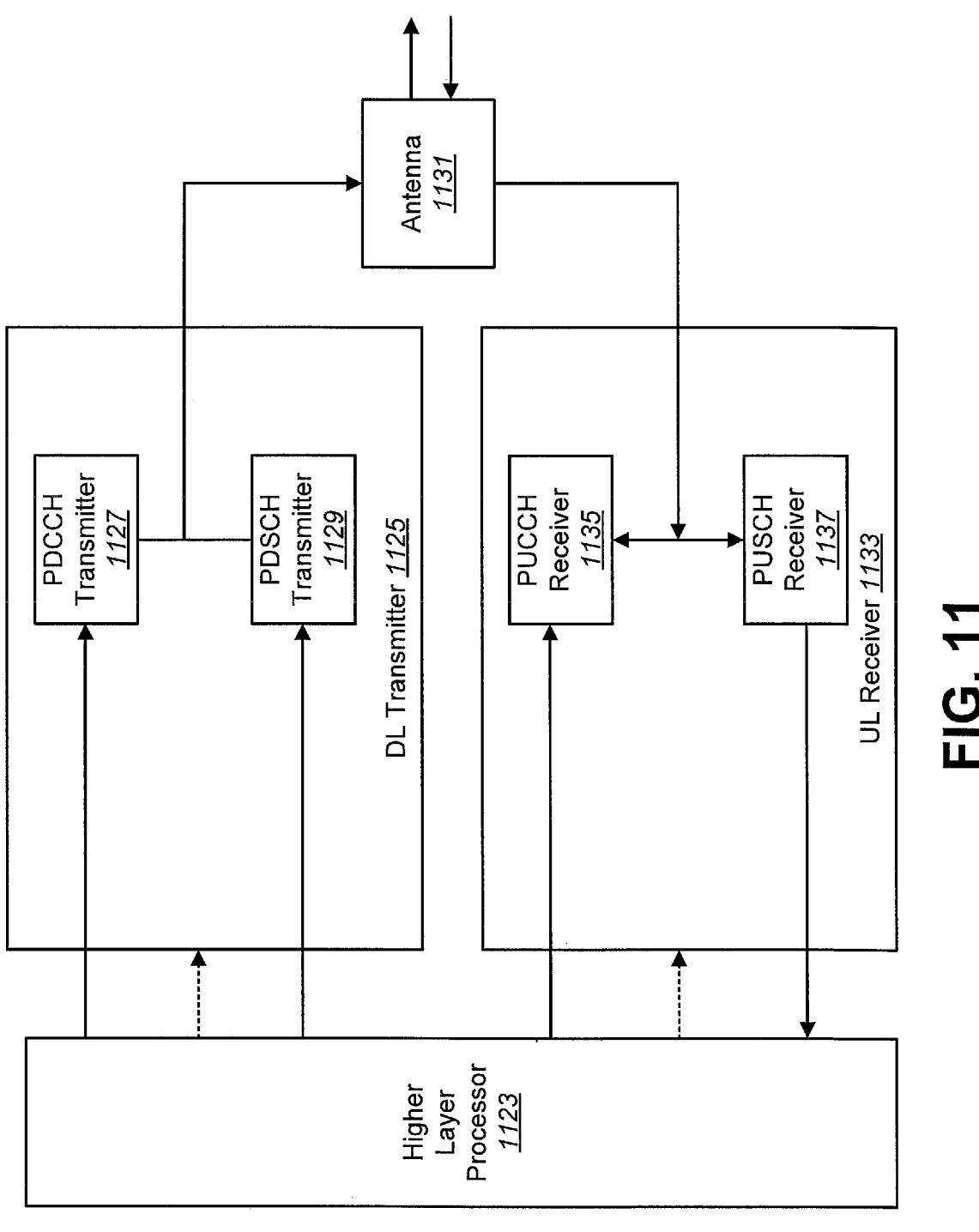
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send and/or acquire higher layer messages such as an RRC message and MAC message to and/or from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
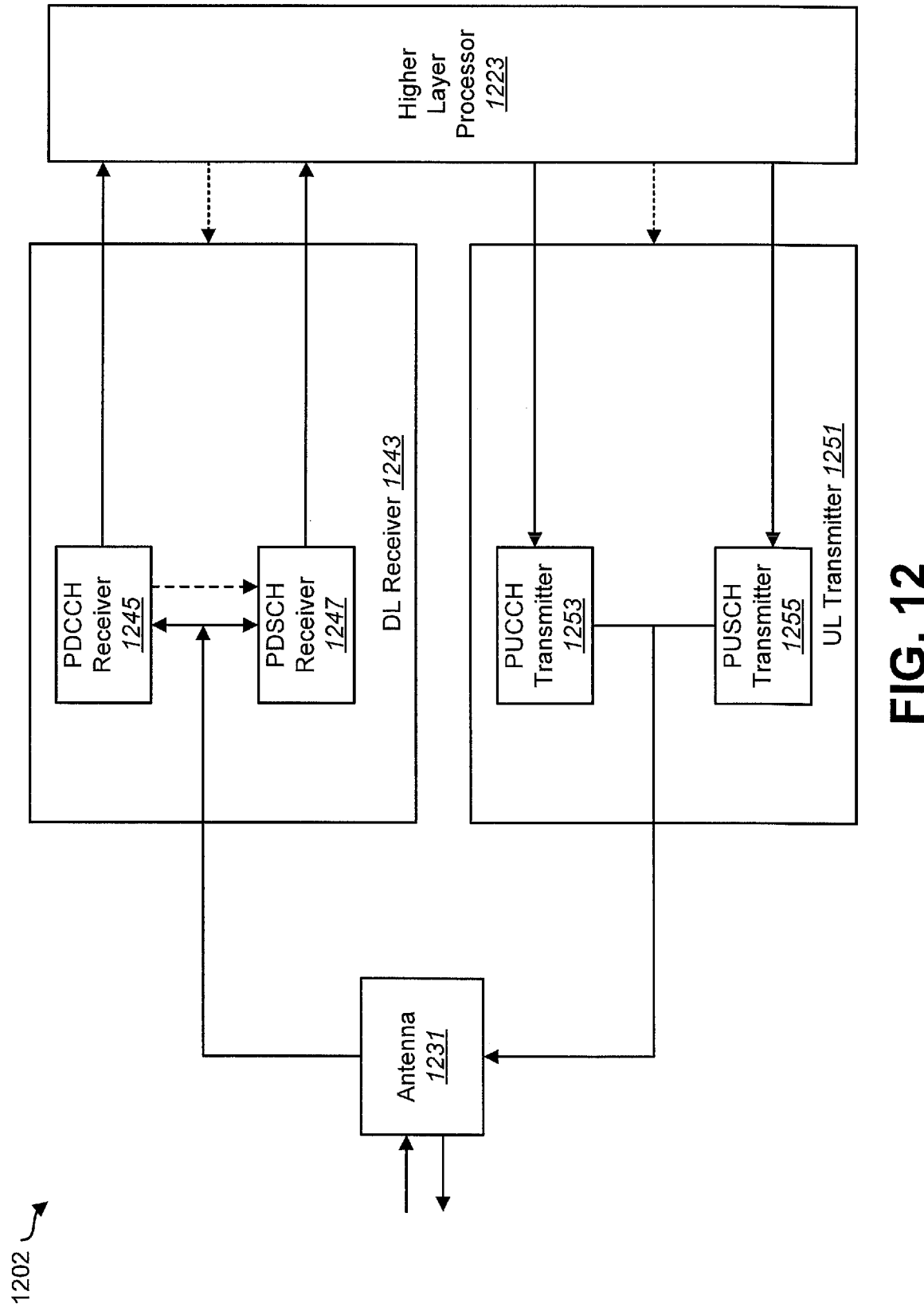
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send and/or acquire higher layer messages such as an RRC message and MAC message to and/or from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
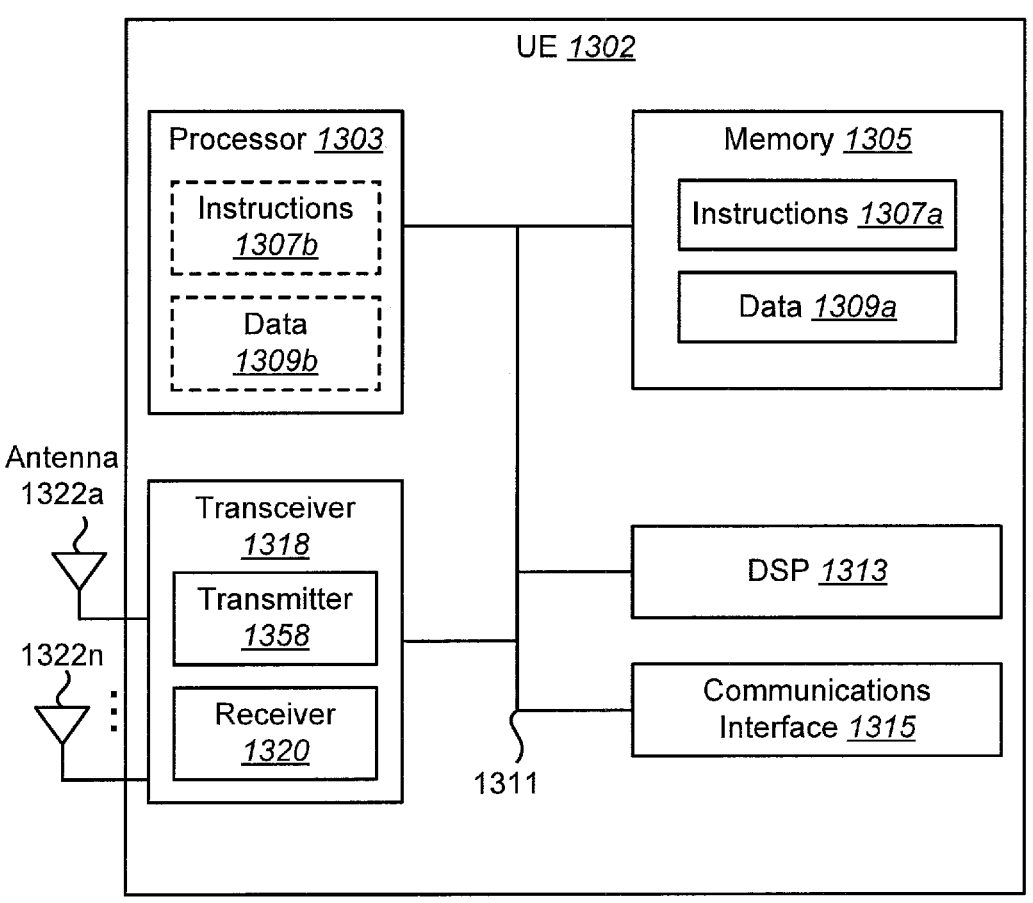
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random-access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the methods described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
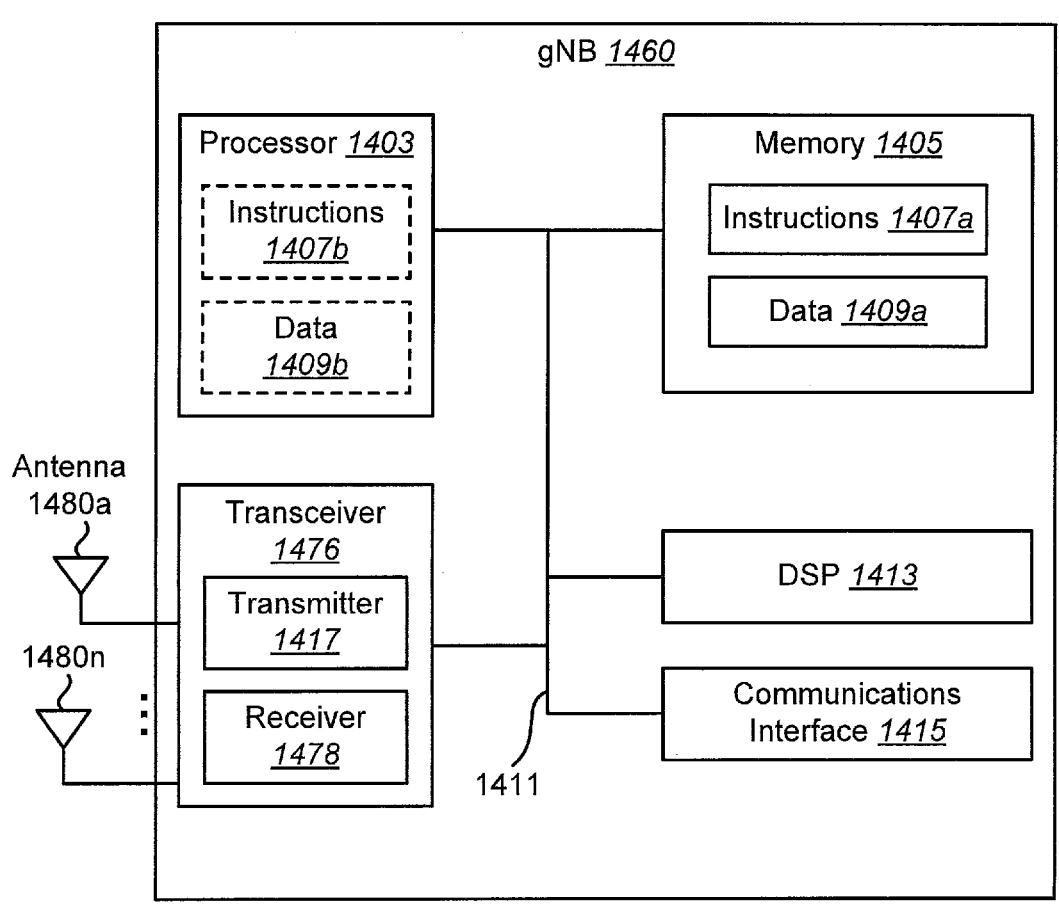
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407a and data 1409a to the processor 1403. A portion of the memory 1405 may also include non-volatile random-access memory (NVRAM). Instructions 1407b and data 1409b may also reside in the processor 1403. Instructions 1407b and/or data 1409b loaded into the processor 1403 may also include instructions 1407a and/or data 1409a from memory 1405 that were loaded for execution or processing by the processor 1403. The instructions 1407b may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
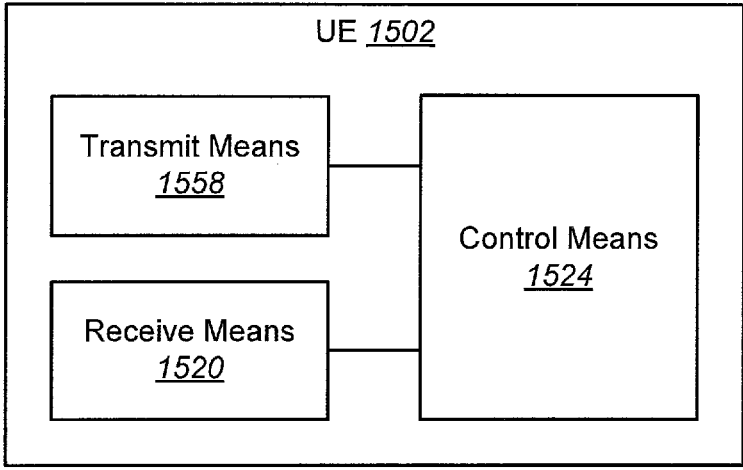
FIG. 15 is a block diagram illustrating one implementation of a UE in which the systems and methods described herein may be implemented.

FIG. 15 is a block diagram illustrating one implementation of a UE 1502 in which the systems and methods described herein may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
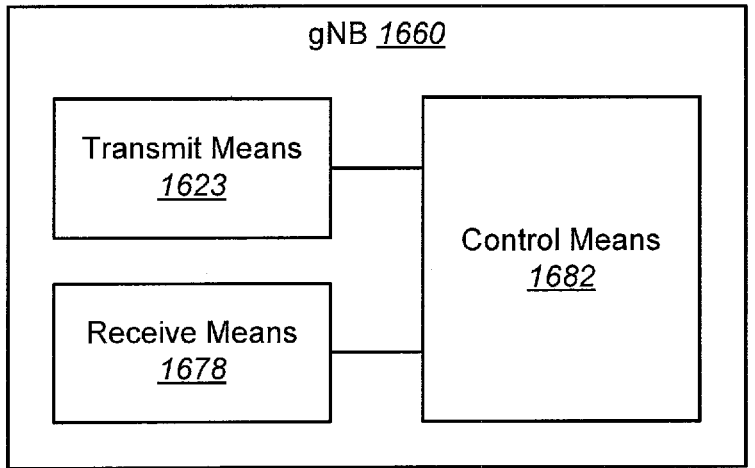
FIG. 16 is a block diagram illustrating one implementation of a gNB in which the systems and methods described herein may be implemented.

FIG. 16 is a block diagram illustrating one implementation of a gNB 1660 in which the systems and methods described herein may be implemented. The gNB 1660 includes transmit means 1623, receive means 1678 and control means 1682. The transmit means 1623, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

FIG. 17 is a flow diagram illustrating a method 1700 by a user equipment (UE) 102. The UE 102 may determine 1702 that joint reporting of uplink control information (UCI) with different priorities is configured and a multiplexing timeline is satisfied. The UE 102 may multiplex 1704 more than two bits of a hybrid automatic repeat request-acknowledgement (HARQ-ACK) and a scheduling request (SR) using a physical uplink control channel (PUCCH) format 2, PUCCH format 3 or PUCCH format 4, wherein the HARQ-ACK and the SR have different priorities. The UE 102 may transmit 1706 the multiplexed HARQ-ACK and SR on a PUCCH.

In one example, bits are appended to the HARQ-ACK by counting scheduling requests (SRs) with all priorities together based on SR indexes. In another example, bits are appended to the HARQ-ACK by counting SRs separately based on SR indexes within each priority. In another example, bits are prepended to the HARQ-ACK for SRs with high priority and bits are appended to the low priority HARQ-ACK for SRs with low priority. In another example, bits are appended or prepended to the HARQ-ACK by counting SRs with high priorities only. In another example, power boosting may be used on the PUCCH transmission if a positive SR with priority index 1 is reported with a HARQ-ACK with priority index 0. In another example, a low priority HARQ-ACK and low priority SRs are jointly reported if no positive high priority SR is reported. In yet another example, a high priority PUCCH resource is selected to report a low priority HARQ-ACK and a positive high priority SR.

FIG. 18 is a flow diagram illustrating a method 1800 by a base station (gNB) 160. The gNB 160 may determine 1802 that joint reporting of uplink control information (UCI) with different priorities is configured and a multiplexing timeline is satisfied. The gNB 160 may receive 1804 a multiplexed hybrid automatic repeat request-acknowledgement (HARQ-ACK) and scheduling request (SR) on a physical uplink control channel (PUCCH). The multiplexed HARQ-ACK and SR include more than two bits. The multiplexed HARQ-ACK and SR use a physical uplink control channel (PUCCH) format 2, PUCCH format 3 or PUCCH format 4. The HARQ-ACK and the SR have different priorities.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

SUMMARY

In one example, a user equipment (UE), comprising: a processor configured to: determine that joint reporting of uplink control information (UCI) with different priorities is configured and a multiplexing timeline is satisfied; and multiplex more than two bits of a hybrid automatic repeat request-acknowledgement (HARQ-ACK) and a scheduling request (SR) using a physical uplink control channel (PUCCH) format 2, PUCCH format 3 or PUCCH format 4, wherein the HARQ-ACK and the SR have different priorities; and transmitting circuitry configured to transmit the multiplexed HARQ-ACK and SR on a PUCCH.

In one example, the UE, wherein bits are appended to the HARQ-ACK by counting scheduling requests (SRs) with all priorities together based on SR indexes.

In one example, the UE, wherein bits are appended to the HARQ-ACK by counting SRs separately based on SR indexes within each priority.

In one example, the UE, wherein bits are prepended to the HARQ-ACK for SRs with high priority and bits are appended to the low priority HARQ-ACK for SRs with low priority.

In one example, the UE, wherein bits are appended or prepended to the HARQ-ACK by counting SRs with high priorities only.

In one example, the UE, wherein power boosting is used on the PUCCH transmission if a positive SR with priority index 1 is reported with a HARQ-ACK with priority index 0.

In one example, the UE, wherein a low priority HARQ-ACK and low priority SRs are joint reported if no positive high priority SR is reported.

In one example, the UE, wherein a high priority PUCCH resource is selected to report a low priority HARQ-ACK and a positive high priority SR.

In one example, a base station (gNB), comprising: a processor configured to determine that joint reporting of uplink control information (UCI) with different priorities is configured and a multiplexing timeline is satisfied; and receiving circuitry configured to receive a multiplexed hybrid automatic repeat request-acknowledgement (HARQ-ACK) and scheduling request (SR) on a physical uplink control channel (PUCCH), the multiplexed HARQ-ACK and SR comprising more than two bits using a PUCCH format 2, PUCCH format 3 or PUCCH format 4, wherein the HARQ-ACK and the SR have different priorities.

In one example, the gNB, wherein bits are appended to the HARQ-ACK by counting scheduling requests (SRs) with all priorities together based on SR indexes.

In one example, the gNB, wherein bits are appended to the HARQ-ACK by counting SRs separately based on SR indexes within each priority.

In one example, the gNB, wherein bits are prepended to the HARQ-ACK for SRs with high priority and bits are appended to the low priority HARQ-ACK for SRs with low priority.

In one example, the gNB, wherein bits are appended or prepended to the HARQ-ACK by counting SRs with high priorities only.

In one example, the gNB, wherein power boosting is used on the PUCCH transmission if a positive SR with priority index 1 is reported with a HARQ-ACK with priority index 0.

In one example, the gNB, wherein a low priority HARQ-ACK and low priority SRs are joint reported if no positive high priority SR is reported.

In one example, the gNB, wherein a high priority PUCCH resource is selected to report a low priority HARQ-ACK and a positive high priority SR.

In one example, a method by a user equipment (UE), comprising: determining that joint reporting of uplink control information (UCI) with different priorities is configured and a multiplexing timeline is satisfied; multiplexing more than two bits of a hybrid automatic repeat request-acknowledgement (HARQ-ACK) and a scheduling request (SR) using a physical uplink control channel (PUCCH) format 2, PUCCH format 3 or PUCCH format 4, wherein the HARQ-ACK and the SR have different priorities; and transmitting the multiplexed HARQ-ACK and SR on a PUCCH.

In one example, a method by a base station (gNB), comprising: determining that joint reporting of uplink control information (UCI) with different priorities is configured and a multiplexing timeline is satisfied; and receiving a multiplexed hybrid automatic repeat request-acknowledgement (HARQ-ACK) and scheduling request (SR) on a physical uplink control channel (PUCCH), the multiplexed HARQ-ACK and SR comprising more than two bits using a PUCCH format 2, PUCCH format 3 or PUCCH format 4, wherein the HARQ-ACK and the SR have different priorities.

CROSS REFERENCE

This Nonprovisional application claims priority under 35 U.S.C. § 119 on provisional Application No. 63/092,398 on Oct. 15, 2020, the entire contents of which are hereby incorporated by reference.

What is claimed is:
1. A user equipment (UE), comprising:
a processor configured to:
determine that a joint reporting of uplink control information (UCI) with different priorities is configured and a multiplexing timeline is satisfied,
determine that a physical uplink control channel (PUCCH) carrying more than two bits of low priority (LP) hybrid automatic repeat request-acknowledgement (HARQ-ACK) overlaps with one or more PUCCH resources for a high priority (HP) scheduling request (SR) and one or more PUCCH resources for an LP SR in a case that the one or more PUCCH resources for the LP SR are present,
generate a number of HP SR bits based on a number of the overlapping one or more PUCCH resources for the HP SR, and prepend the HP SR bits to the LP HARQ-ACK, and
generate a number of LP SR bits based on a number of the overlapping one or more PUCCH resources for the LP SR in a case that the overlapping one or more

PUCCH resources for the LP SR are present, and append the LP SR bits to the LP HARQ-ACK; and transmitting circuitry configured to transmit a multiplexed HARQ-ACK and SR on the PUCCH configured for the LP HARQ-ACK based on a total payload of the multiplexed HARQ-ACK and SR.

2. The UE of claim 1, wherein the LP SR bits are appended to the LP HARQ-ACK by counting scheduling requests (SRs) with all priorities together based on SR indexes.

3. The UE of claim 1, wherein the LP SR bits are appended to the LP HARQ-ACK by counting scheduling requests (SRs) separately based on SR indexes within each priority.

4. The UE of claim 1, wherein the HP SR bits are prepended to the LP HARQ-ACK for scheduling requests (SRs) with a high priority and the LP SR bits are appended to the LP HARQ-ACK for SRs with a low priority.

5. The UE of claim 1, wherein bits are appended or prepended to the LP HARQ-ACK by counting scheduling requests (SRs) with high priorities only.

6. The UE of claim 1, wherein the LP HARQ-ACK and LP scheduling requests (SRs) are jointly reported in a case that no positive high priority SR is reported.

7. The UE of claim 1, wherein a high priority PUCCH resource is selected to report the LP HARQ-ACK and a positive high priority SR.

8. A base station (gNB), comprising:
a processor configured to;
  determine that a joint reporting of uplink control information (UCI) with different priorities is configured and a multiplexing timeline is satisfied,
  determine that a physical uplink control channel (PUCCH) carrying more than two bits of low priority (LP) hybrid automatic repeat request-acknowledgement (HARQ-ACK) overlaps with one or more PUCCH resources for a high priority (HP) scheduling request (SR) and one or more PUCCH resources for an LP SR in a case that the one or more PUCCH resources for the LP SR are present, wherein the UE:
    generates a number of HP SR bits based on a number of the overlapping one or more PUCCH resources for the HP SR, and prepends the HR SR bits to the LP HARQ-AC, and
    generates a number of LP SR bits based on a number of the overlapping one or more PUCCH resources for the LP SR in a case that the overlapping one or more PUCCH resources for the LP SR bits are present, and appends the LP SR bits to the LP HARQ-ACK; and
receiving circuitry configured to receive a multiplexed HARQ-ACK and SR on the PUCCH configured for the LP HARQ-ACK based on a total payload of the multiplexed HARQ-ACK and SR, the multiplexed HARQ-ACK and SR comprising more than two bits using a PUCCH format 2, a PUCCH format 3, or a PUCCH format 4, wherein the multiplexed HARQ-ACK and the SR have different priorities.

9. The gNB of claim 8, wherein the LP SR bits are appended to the LP HARQ-ACK by counting scheduling requests (SRs) with all priorities together based on SR indexes.

10. The gNB of claim 8, wherein the LP SR bits are appended to the LP HARQ-ACK by counting scheduling requests (SRs) separately based on SR indexes within each priority.

11. The gNB of claim 8, wherein the HP SR bits are prepended to the LP HARQ-ACK for scheduling requests (SRs) with a high priority and the LP SR bits are appended to the LP HARQ-ACK for SRs with a low priority.

12. The gNB of claim 8, wherein bits are appended or prepended to the LP HARQ-ACK by counting scheduling requests (SRs) with high priorities only.

13. The gNB of claim 8, wherein the LP HARQ-ACK and LP scheduling requests (SRs) are jointly reported if no positive high priority SR is reported.

14. The gNB of claim 8, wherein a high priority PUCCH resource is selected to report the LP HARQ-ACK and a positive high priority SR.

15. A method performed by a user equipment (UE), the method comprising:
  determining that a joint reporting of uplink control information (UCI) with different priorities is configured and a multiplexing timeline is satisfied;
  determining that a physical uplink control channel (PUCCH) carrying more than two bits of low priority (LP) hybrid automatic repeat request-acknowledgement (HARQ-ACK) overlaps one or more PUCCH resources for a high priority (HP) scheduling request (SR) and one or more PUCCH resources for an LP SR in a case that the one or more PUCCH resources for the LP SR are present;
  generating a number of HP SR bits based on a number of the overlapping one or more PUCCH resources for the HP SR, and prepending the HP SR bits to the LP HARQ-ACK;
  generating a number of LP SR bits based on a number of the overlapping with one or more PUCCH resources for the LP SR in a case that the overlapping one or more PUCCH resources for the LP SR are present, and appending the LP SR bits to the LP HARQ-ACK; and
  transmitting a multiplexed HARQ-ACK and SR on the PUCCH configured for the LP HARQ-ACK based on a total payload of the multiplexed HARQ-ACK and SR.

* * * * *